US008831627B2

(12) United States Patent
Aninye et al.

(10) Patent No.: US 8,831,627 B2
(45) Date of Patent: *Sep. 9, 2014

(54) SYSTEM AND METHOD FOR TRACKING, MONITORING, COLLECTING, REPORTING AND COMMUNICATING WITH THE MOVEMENT OF INDIVIDUALS

(75) Inventors: Steve Aninye, Alpharetta, GA (US); Yoganand Rajala, Alpharetta, GA (US)

(73) Assignee: Omnilink Systems, Inc., Alpharetta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/639,524

(22) Filed: Dec. 16, 2009

(65) Prior Publication Data

US 2010/0222073 A1 Sep. 2, 2010

Related U.S. Application Data

(62) Division of application No. 10/591,830, filed as application No. PCT/US2006/012754 on Apr. 6, 2006, now abandoned.

(60) Provisional application No. 60/670,082, filed on Apr. 6, 2005, provisional application No. 60/678,823, filed on May 6, 2005.

(51) Int. Cl.
G08B 1/08 (2006.01)
G08B 23/00 (2006.01)
B60R 25/33 (2013.01)
B60R 25/10 (2013.01)
B60R 25/102 (2013.01)
G08B 21/22 (2006.01)
G08B 21/02 (2006.01)

(52) U.S. Cl.
CPC ............ B60R 25/1018 (2013.01); B60R 25/33 (2013.01); B60R 25/102 (2013.01); B60R 2325/105 (2013.01); B60R 25/1004 (2013.01); G08B 21/22 (2013.01); G08B 21/0286 (2013.01)
USPC .............. 455/456.1; 340/539.11; 340/539.13; 340/573.4; 340/693.5

(58) Field of Classification Search
CPC ...... G08B 21/22; G08B 1/08; G08B 21/0261; G08B 21/0269; G08B 21/0272; G08B 21/0286; G08B 21/0288; G08B 21/0423; G08B 21/0492; G01S 5/00; G01S 5/0027; H04W 4/02; H04W 4/18; H04W 4/20
USPC ............... 340/539.21, 539.1, 539.11–539.15, 340/539.22–539.24, 539.26, 340/539.31–539.32, 545.2–545.3, 546, 340/573.1–573.7, 573.1–573.7; 361/654, 361/672–673; 455/414.1–414.2, 41.1–41.3, 455/575.1, 575.6, 557, 90.3
See application file for complete search history.

(56) References Cited

U.S. PATENT DOCUMENTS 4,359,733 A 11/1982 O'Neill
4,673,936 A 6/1987 Kotoh
(Continued)

FOREIGN PATENT DOCUMENTS

DE 19832671 1/2000
EP 0528090 2/1993
(Continued)

OTHER PUBLICATIONS

European Search Report issued in EP Appl 10150064.3 on Mar. 12, 2010.
(Continued)

Primary Examiner — Nizar Sivji
(74) Attorney, Agent, or Firm — King & Spalding

(57) ABSTRACT

A tamper resistant and easily adjustable mobile tracking device is provided, or alternatively may be created by adding appropriate programming to a GPS enabled cellular communications device, by which location data and other information is transmitted to an administrative hub for processing and distribution according to operator defined parameters. Confirmed two-way communications are possible with mobile devices having display screens.

18 Claims, 21 Drawing Sheets

(56) References Cited

U.S. PATENT DOCUMENTS

| | | | |
|---|---|---|---|
| 4,736,196 A | 4/1988 | McMahon | |
| 4,747,120 A | 5/1988 | Foley | |
| 4,750,197 A | 6/1988 | Denekamp et al. | |
| 4,777,477 A | 10/1988 | Watson | |
| 4,812,823 A | 3/1989 | Dickerson | |
| 4,885,571 A | 12/1989 | Pauley et al. | |
| 4,918,425 A | 4/1990 | Greenberg et al. | |
| 4,918,432 A | 4/1990 | Pauley et al. | |
| 4,952,928 A | 8/1990 | Carroll | |
| 4,999,613 A | 3/1991 | Williamson | |
| 5,043,736 A | 8/1991 | Darnell | |
| 5,182,543 A | 1/1993 | Siegel | |
| 5,204,670 A | 4/1993 | Stinton | |
| 5,298,884 A | 3/1994 | Gilmore | |
| 5,365,516 A | 11/1994 | Jandrell | |
| 5,461,365 A | 10/1995 | Schlager et al. | |
| 5,461,390 A | 10/1995 | Hoshen | |
| 5,468,110 A | 11/1995 | McDonald et al. | |
| 5,471,197 A | 11/1995 | McCurdy et al. | |
| 5,493,694 A | 2/1996 | Vlcek | |
| 5,497,148 A | 3/1996 | Oliva | |
| 5,497,149 A | 3/1996 | Fast | |
| 5,504,474 A | 4/1996 | Libman | |
| 5,518,402 A | 5/1996 | Tommarello | |
| 5,523,740 A | 6/1996 | Burgmann | |
| 5,537,102 A | 7/1996 | Pinnow | |
| 5,552,772 A | 9/1996 | Janky et al. | |
| 5,559,520 A | 9/1996 | Barzegar | |
| 5,568,119 A | 10/1996 | Schipper et al. | |
| 5,593,267 A | 1/1997 | McDonald et al. | |
| 5,594,425 A | 1/1997 | Ladner | |
| 5,623,390 A | 4/1997 | Noda et al. | |
| 5,627,520 A | 5/1997 | Grubbs | |
| 5,646,632 A | 7/1997 | Khan | |
| 5,650,766 A | 7/1997 | Burgmann | |
| 5,650,770 A | 7/1997 | Schlager et al. | |
| 5,652,570 A | 7/1997 | Lepkofker | |
| 5,712,619 A | 1/1998 | Simkin | |
| 5,714,931 A | 2/1998 | Petite et al. | |
| 5,731,757 A | 3/1998 | Layson | |
| 5,742,233 A | 4/1998 | Hoffman et al. | |
| 5,742,509 A | 4/1998 | Goldberg et al. | |
| 5,748,148 A | 5/1998 | Heiser | |
| 5,752,976 A | 5/1998 | Duffin | |
| 5,825,283 A | 10/1998 | Camhi | |
| 5,828,987 A | 10/1998 | Tano et al. | |
| 5,835,377 A | 11/1998 | Bush | |
| 5,835,907 A | 11/1998 | Newman | |
| 5,838,237 A | 11/1998 | Revell et al. | |
| 5,852,401 A | 12/1998 | Kita | |
| 5,857,433 A | 1/1999 | Files | |
| 5,867,103 A | 2/1999 | Taylor | |
| 5,870,029 A | 2/1999 | Otto et al. | |
| 5,890,061 A | 3/1999 | Timm | |
| 5,892,454 A | 4/1999 | Schipper et al. | |
| D410,206 S | 5/1999 | Slater | |
| 5,905,461 A | 5/1999 | Neher | |
| 5,940,004 A | 8/1999 | Fulton | |
| 5,948,038 A | 9/1999 | Daley et al. | |
| 5,959,533 A | 9/1999 | Layson, Jr. | |
| 5,982,281 A | 11/1999 | Layson, Jr. | |
| 5,990,793 A | 11/1999 | Bieback | |
| 6,011,510 A | 1/2000 | Yee | |
| 6,014,080 A | 1/2000 | Layson, Jr. | |
| 6,024,928 A | 2/2000 | Foster | |
| 6,054,928 A | 4/2000 | Lemelson et al. | |
| D424,463 S | 5/2000 | Babers, Jr. | |
| 6,072,396 A | 6/2000 | Gaukel | |
| 6,084,517 A | 7/2000 | Rabanne | |
| 6,084,547 A | 7/2000 | Sanderford et al. | |
| 6,100,806 A | 8/2000 | Gaukel | |
| 6,104,295 A | 8/2000 | Tenarvitz et al. | |
| 6,131,067 A | 10/2000 | Girerd et al. | |
| 6,150,921 A | 11/2000 | Werb | |
| 6,160,481 A | 12/2000 | Taylor, Jr. | |
| 6,181,253 B1 | 1/2001 | Eschenbach et al. | |
| 6,198,431 B1 | 3/2001 | Gibson | |
| D440,170 S | 4/2001 | Conerly | |
| 6,218,945 B1 | 4/2001 | Taylor, Jr. | |
| 6,232,880 B1 | 5/2001 | Anderson et al. | |
| 6,232,916 B1 | 5/2001 | Grillo | |
| 6,239,700 B1 | 5/2001 | Hoffman et al. | |
| 6,278,370 B1 | 8/2001 | Underwood | |
| 6,344,794 B1 | 2/2002 | Ulrich et al. | |
| 6,353,406 B1 | 3/2002 | Lanzl | |
| 6,356,841 B1 | 3/2002 | Hamrick et al. | |
| 6,392,565 B1 | 5/2002 | Brown | |
| 6,405,213 B1 * | 6/2002 | Layson et al. | 340/539.1 |
| 6,430,813 B2 | 8/2002 | Muraguchi et al. | |
| 6,431,455 B1 | 8/2002 | Ponert | |
| 6,438,380 B1 | 8/2002 | Bi | |
| 6,483,427 B1 | 11/2002 | Werb | |
| 6,512,456 B1 | 1/2003 | Taylor, Jr. | |
| 6,581,546 B1 | 6/2003 | Dalland | |
| 6,606,556 B2 | 8/2003 | Curatolo et al. | |
| 6,624,750 B1 | 9/2003 | Marman et al. | |
| 6,639,516 B1 | 10/2003 | Copley | |
| 6,646,617 B1 | 11/2003 | Gaukel | |
| 6,693,543 B1 * | 2/2004 | Stephenson et al. | 340/572.9 |
| 6,703,936 B2 | 3/2004 | Hill et al. | |
| 6,711,500 B2 | 3/2004 | Cheng | |
| 6,747,555 B2 | 6/2004 | Fellenstein et al. | |
| 6,774,797 B2 | 8/2004 | Freathy et al. | |
| 6,774,799 B2 | 8/2004 | Defant | |
| 6,801,853 B2 | 10/2004 | Workman | |
| 6,812,824 B1 | 11/2004 | Goldinger | |
| 6,838,998 B1 | 1/2005 | Brown | |
| 6,840,904 B2 | 1/2005 | Goldberg | |
| 6,853,304 B2 * | 2/2005 | Reisman et al. | 340/573.4 |
| 6,862,454 B1 | 3/2005 | Kanevsky | |
| RE38,838 E | 10/2005 | Taylor | |
| 6,961,592 B2 | 11/2005 | O'Connor | |
| 6,972,684 B2 | 12/2005 | Copley | |
| 6,975,222 B2 | 12/2005 | Krishan | |
| 6,975,234 B2 * | 12/2005 | Boccacci | 340/573.4 |
| 6,992,582 B2 | 1/2006 | Hill et al. | |
| 7,015,817 B2 * | 3/2006 | Copley et al. | 340/573.4 |
| 7,034,678 B2 | 4/2006 | Burkley et al. | |
| 7,034,695 B2 | 4/2006 | Troxler | |
| D520,393 S | 5/2006 | Darby | |
| 7,038,590 B2 | 5/2006 | Hoffman et al. | |
| 7,064,670 B2 | 6/2006 | Galperin | |
| 7,079,034 B2 | 7/2006 | Stilp | |
| 7,098,795 B2 | 8/2006 | Adamczyk et al. | |
| 7,119,695 B2 | 10/2006 | Defant | |
| D534,822 S | 1/2007 | Wadda | |
| D535,205 S | 1/2007 | Frederick et al. | |
| 7,209,757 B2 | 4/2007 | Naghian et al. | |
| 7,283,044 B2 | 10/2007 | Bandy | |
| 7,289,786 B2 | 10/2007 | Krasner | |
| RE39,909 E | 11/2007 | Taylor, Jr. | |
| 7,299,987 B2 | 11/2007 | Yoo et al. | |
| 7,382,268 B2 | 6/2008 | Hartman | |
| 7,492,254 B2 | 2/2009 | Bandy et al. | |
| 7,518,514 B2 | 4/2009 | Bauchot et al. | |
| 7,598,855 B2 | 10/2009 | Scalisi et al. | |
| 7,728,724 B1 | 6/2010 | Scalisi et al. | |
| 7,877,104 B2 | 1/2011 | Turetzky | |
| 7,884,712 B2 | 2/2011 | Nierenberg | |
| 2001/0048364 A1 | 12/2001 | Kalthoff et al. | |
| 2003/0030561 A1 | 2/2003 | Yafuso | |
| 2003/0034894 A1 | 2/2003 | Montagnino | |
| 2003/0112141 A1 | 6/2003 | Arunkumar | |
| 2003/0174059 A1 * | 9/2003 | Reeves | 340/573.4 |
| 2003/0210140 A1 * | 11/2003 | Menard et al. | 340/531 |
| 2003/0210142 A1 * | 11/2003 | Freathy et al. | 340/539.13 |
| 2003/0210149 A1 * | 11/2003 | Reisman et al. | 340/573.4 |
| 2003/0227382 A1 | 12/2003 | Breed | |
| 2004/0080421 A1 * | 4/2004 | Wunderlich | 340/539.13 |
| 2006/0109110 A1 | 5/2006 | Hill | |
| 2006/0266917 A1 | 11/2006 | Sisinio | |
| 2007/0276270 A1 | 11/2007 | Tran | |
| 2008/0001764 A1 | 1/2008 | Douglas et al. | |
| 2008/0018459 A1 * | 1/2008 | Derrick et al. | 340/539.13 |

(56) References Cited

U.S. PATENT DOCUMENTS

| | | | |
|---|---|---|---|
| 2008/0055109 | A1 | 3/2008 | Freathy |
| 2008/0108370 | A1 | 5/2008 | Aninye |
| 2008/0278327 | A1 | 11/2008 | Nierenberg |
| 2009/0051562 | A1* | 2/2009 | Potter et al. ............... 340/693.5 |
| 2009/0251313 | A1 | 10/2009 | Perkins |
| 2011/0128148 | A1 | 6/2011 | Nierenberg |

FOREIGN PATENT DOCUMENTS

| | | |
|---|---|---|
| EP | 0745867 | 12/1996 |
| EP | 1363258 | 11/2003 |
| GB | 2279170 | 12/1994 |
| GB | 2383666 | 7/2003 |
| WO | WO 88/09541 | 12/1988 |

OTHER PUBLICATIONS

English Abstract of DE 19832671 published Jan. 27, 2000.
File History of U.S. Appl. No. 10/591,830.
File History of U.S. Appl. No. 11/935,833.
File History of U.S. Appl. No. 29/279,448.
U.S. Appl. No. 11/806,841, Jun. 1, 2007, Taylor, Jr.
U.S. Appl. No. 90/010,372, Dec. 26, 2008, Taylor.
Search Report issued in PCT/US2006/017541.
International Preliminary Report of Patentability issued in PCT/US06/017541.
Search Report issued in PCT/US2006/017678.
International Preliminary Report of Patentability issued in PCT/US06/017678.
Notice of Allowance issued in U.S. Appl. No. 29/279,448 mailed Jun. 27, 2008.
Notice of Allowance issued in U.S. Appl. No. 11/935,833 mailed Oct. 8, 2008.
Office Action issued in U.S. Appl. No. 10/591,830 mailed Dec. 26, 2008.
Murphy, John. "Advanced Electronic Monitorina for Tracking Persons on Probation or Parole," Feb. 29, 1996, pp. 1-34 and Appendix A.
Hoshen, Joseph. "Keeping Tabs on Criminals," IEEE Spectrum, Feb. 1995, pp. 26-31.
Whitfield, Dick. "Tackling the Tag," Chapter 9, 1997, pp. 109-119.
Pro Tech Monitoring, Inc., SMART Systems Briefing, circa 1995-1996.
EBSCO Host, "'Spy' In the Sky," Onternational Construction, 00206415, Aug. 1997, vol. 36, Issue 8.
Gable, Ralph. "Application of Personal Telemonitoring to Current Problems in Corrections," Journal of Criminal Justice, vol. 14, pp. 167-176 (1986).
Holland, James. Political Implications of Applying Behavioral Pschology, Mexico City, 1972.
Mainprize, Steve. "Elective Affinities in the Engineering of Social Control: The Evolution of Electronic Monitoring," ISSN: 1198 3655, Electronic Journal of Sociology (1996).
Le Marshall, Chris, "Single Geostatic Orbital Satellite in Tracking Ground-Based Mobile Radio Transmitter," National Air Intelligence Center, Oct. 11, 1995.
Montes, Marisela. "Technological Advances in Parole Supervision," Corrections Today, vol. 58, Issue 4, Jul. 1996.
Nieto, Marcus. "Community Correction Punishments: An Alternative to Incarceration for Nonviolent Offenders," May 1996.
Schwitzgebel, Robert. "Psychotechnology Electronic Control of Mind and Behavior," Chapter 4, New York, 1973.
U.S. Appl. No. 90/010,372, filed Dec. 26, 2008.
Wade, Andy. Book Review: *Tracking the Tag: The Electronic Monitoring of Offenders*, by Dick Whitfield, Probation Journal; 1997; 44; 234.
Harris County Invitation to Bid, Lease of Electronic Monitoring Equipment for the Harris County Community Supervision and Correction Department, circa 1994.
Electronic Monitoring; A listing of materials available at the Justice Institute Library, Oct. 6, 2006.
File history of U.S. Patent 6,100,806.
"Current Electronic Monitoring Market Place", circa 1995-1996.
Extended European Search Report issued in EP Appl 06759293.1 on Oct. 23, 2009.
Extended European Search Report issued in EP Appl 06740595.1 on Oct. 5, 2009.
File History of U.S. Appl. No. 12/112,695.
File History of U.S. Appl. No. 12/350,678.
File History of U.S. Appl. No. 12/794,500.
Notice of Allowance issued in EP Appl 06759293.1 on Dec. 7, 2010.
File History of U.S. Appl. No. 11/935,858.
FIle History of U.S. Appl. No. 12/112,695.
International Search Report and Written Opinion issued in PCT/US2011/023144 mailed Oct. 12, 2011.
Canadian Office Action issued in CN 2,604,157 dated Aug. 28, 2012.
Canadian Office Action issued in CN 2,604,157 dated Sep. 19, 2013.
Response filed in Canadian Application No. 2,604,157 on Mar. 19, 2014.

* cited by examiner

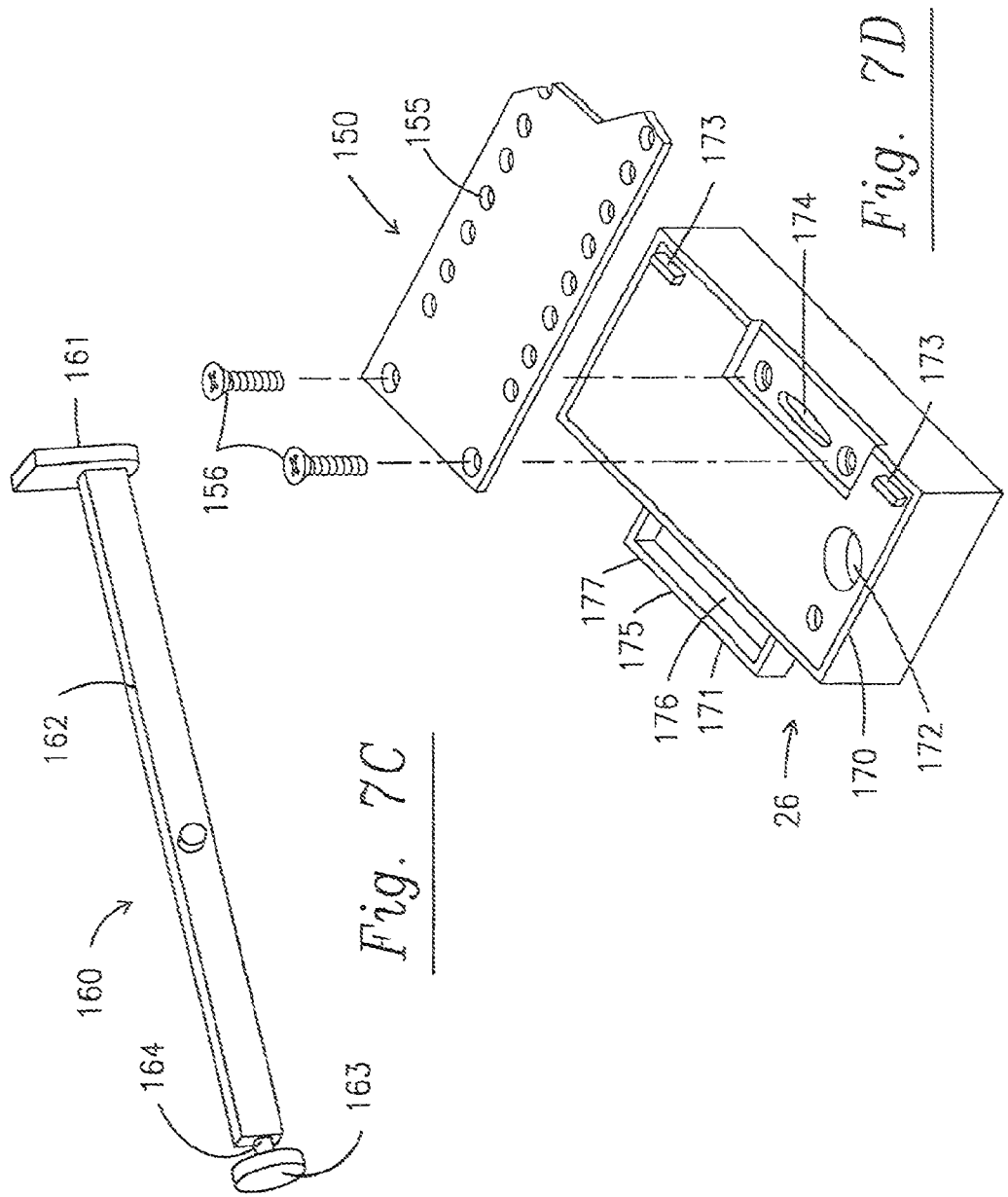

Map Text -- Rout History Info of Aninye, Steve (Driver)

Export — 317

| No | Time | Street Address | City |
|---|---|---|---|
| 1 | 3/10/2005 11:50:26 AM | 1299 ST RT 140 | ROSWELL -- 30076 |
| 2 | 3/10/2005 11:51:45 AM | MARKET BLVD. | ROSWELL -- 30076 |
| 3 | 3/10/2005 11:53:02 AM | 1618 HOLCOMB BRIDGE RD | ROSWELL -- 30076 |
| 4 | 3/10/2005 11:55:30 AM | 2275 HWY 140 | ROSWELL -- 30076 |
| 5 | 3/10/2005 11:57:37 AM | 2924 HWY 140 | ROSWELL -- 30022 |
| 6 | 3/10/2005 11:50:26 AM | 3070 HWY 140 | ROSWELL -- 30022 |
| 7 | 3/10/2005 12:36:32 PM | 8668 NESBIT FERRY RD | ROSWELL -- 30022 |
| 8 | 3/10/2005 2:47:36 PM | 9252 NESBIT FERRY RD | ROSWELL -- 30022 |
| 9 | 3/10/2005 2:49:13 PM | 8965 NESBIT FERRY RD | ROSWELL -- 30022 |
| 10 | 3/10/2005 2:52:02 PM | 120 RIVERSONS DR | ROSWELL -- 30076 |
| 11 | 3/10/2005 2:53:15 PM | 2327 HWY 140 | ROSWELL -- 30076 |
| 12 | 3/10/2005 2:55:21 PM | 1772 ST RT 14 | ROSWELL -- 30076 |
| 13 | 3/10/2005 2:57:33 PM | 1422 HWY 140 | ROSWELL -- 30076 |
| 14 | 3/10/2005 2:58:50 PM | HWY 400 | ROSWELL -- 30076 |
| 15 | 3/10/2005 3:01:15 PM | HWY 400 | ALPHARETTA -- 30022 |
| 16 | 3/10/2005 3:03:54 PM | HWY 400 | ALPHARETTA -- 30022 |
| 17 | 3/10/2005 3:05:10 PM | HWY 400 | ALPHARETTA -- 30005 |
| 18 | 3/10/2005 3:07:44 PM | HWY 400 | ALPHARETTA -- 30005 |

Company Notifications Defaults 430

Agency 432

| Alert Name | Fax | Pager | E-Mail | SMS | Send Immediately | Send Summary |
|---|---|---|---|---|---|---|
| Exclusion Zone Violation | ☒ | ☒ | ☒ | ☒ | ☒ | ☒ |
| Exclusion Zone Violation Clear | ☐ | ☐ | ☐ | ☐ | ☐ | ☒ |
| Inclusion Zone Violation | ☒ | ☒ | ☒ | ☒ | ☒ | ☒ |
| Battery Running Low | ☒ | ☒ | ☒ | ☒ | ☒ | ☒ |
| Battery Running Low Clear | ☐ | ☐ | ☐ | ☐ | ☐ | ☒ |
| Did not call | ☒ | ☒ | ☒ | ☒ | ☒ | ☒ |
| Did not call clear | ☐ | ☐ | ☐ | ☐ | ☐ | ☒ |
| Recharge Schedule Alert | ☒ | ☒ | ☒ | ☒ | ☒ | ☒ |
| Recharge Schedule Alert Clear | ☐ | ☐ | ☐ | ☐ | ☐ | ☒ |
| Strap Tamper | ☒ | ☒ | ☒ | ☒ | ☒ | ☒ |
| Strap Tamper Clear | ☐ | ☐ | ☐ | ☐ | ☐ | ☒ |

Officer

| Alert Name | Fax | Pager | E-Mail | SMS | Send Immediately | Send Summary |
|---|---|---|---|---|---|---|
| Exclusion Zone Violation | ☐ | ☒ | ☒ | ☒ | ☒ | ☒ |
| Exclusion Zone Violation Clear | ☐ | ☐ | ☒ | ☐ | ☐ | ☒ |
| Inclusion Zone Violation | ☐ | ☒ | ☒ | ☒ | ☒ | ☒ |
| Battery Running Low | ☐ | ☒ | ☒ | ☒ | ☒ | ☒ |
| Battery Running Low Clear | ☐ | ☐ | ☒ | ☐ | ☐ | ☒ |
| Did not call | ☐ | ☒ | ☒ | ☒ | ☒ | ☒ |

SYSTEM AND METHOD FOR TRACKING, MONITORING, COLLECTING, REPORTING AND COMMUNICATING WITH THE MOVEMENT OF INDIVIDUALS

CROSS REFERENCE TO RELATED APPLICATIONS

This application is a Divisional of U.S. application Ser. No. 10/591,830 filed Sep. 6, 2006. U.S. application Ser. No. 10/591,830 is the National Stage Application of PCT/US2006/012754 filed Apr. 6, 2006. National Stage Application of PCT/US2006/012754 claims priority to the Apr. 6, 2005 filing date of U.S. provisional patent application Ser. No. 60/670,082 and the May 6, 2005 filing date of U.S. provisional patent application Ser. No. 60/678,823. The entirety of all of the above-listed applications are incorporated herein by reference.

FIELD OF THE INVENTION

The system and method of the present invention is utilized in tracking the position of an individual using GPS signals and cell phone location technologies for both real time and later comparison with parameters and providing bidirectional communication capability with the tracking device associated with the individual.

BACKGROUND OF THE INVENTION

Many devices and systems are known to monitor the position and movements of individuals. Employers use devices to monitor employees against diversion from work-related locations, and such devices may be installed in work vehicles, attached to accessories such as computers, or comprise other GPS enabled devices. In addition, in the case of house arrest, the offender must often carry a body-worn device to permit position monitoring. The monitoring of individuals may take either active or passive forms. An active system will compare its location with ongoing restrictions to detect violations. Such a violation may occur by either coming into broadcast range of a prohibited zone, leaving broadcast range of a confinement zone, or by actual location determination and mapping against both permitted and exclusion zones. Alternatively, passive devices may simply record and transmit location information for later or real time comparison with permitted and excluded zones at a remote system.

Many devices have been proposed and employed for such uses. Among the most common are multi-component systems. Such systems typically include a wearable radio frequency (RF) bracelet that communicates with some type of base device. This may be a fixed base system with access to a telephone line that places a telephone call to a monitoring service anytime the RF signal is not detected. Alternatively, it may be a portable base equipped with GPS location technology that detects the presence of the bracelet RF signal and also tracks movements and periodically communicates, typically through wireless phone technology, to report those locations. These devices may also have the capability of displaying text messages from the monitoring officer or agency on an LCD screen. Some base attachments have attempted to utilize voice recognition technology to provide verification of the identity of a person present and responding to a phone call placed through the base unit.

Generally absent from these systems is the ability for real time or near real time communication directly between a remote system and the locator device associated with the individual. In addition, the component costs of custom devices is unnecessarily high compared to the prices available for mass market cellular telephone and GPS technology. Many systems require dedicated phone lines, require the monitored individual to wear or carry obtrusive hardware, require additional hardware for monitoring personnel, lack adequate battery life for multi-day usage, are subject to drift due to GPS signal errors, and lack a method for confirming receipt of messages sent between monitoring personnel and a monitored individual.

Accordingly, there is a need for an individual tracking system that can be deployed with software capable of running on a wide variety of devices and is therefore largely device agnostic.

There is also a need for an individual tracking system that does not require the use of dedicated phone lines or obtrusive hardware. There is also a need to provide real time or active tracking and active notification to monitoring personnel.

SUMMARY OF THE INVENTION

Accordingly, it is an object of the invention to provide a largely device agnostic system for monitoring of individuals.

It is further an object of the invention to implement individual tracking capability without the necessity of obtrusive hardware or dedicated phone lines.

It is yet another object of the invention to provide an individual tracking system that does not require specialized hardware for monitoring personnel.

It is a further object of the invention to provide active or real time location information concerning monitored individuals and to provide active notification to monitoring personnel.

It is another object of the invention to provide a method for confirmed communications between monitoring personnel and a monitored individual.

It is yet a further object of the invention to provide an easily adjustable and tamper resistant wearable tracking device.

BRIEF DESCRIPTION OF THE DRAWINGS

FIG. 7C is a perspective view of a locking pin utilized to hold the strap of FIG. 7B in place.

FIG. 7D is a rear perspective view of a monitoring device according to the present invention.

FIG. 9B is a pop up text window reflecting the graphical data of FIG. 9A.

FIG. 12 shows a screen display of a data entry template for a new individual to be monitored according to the present invention.

FIG. 16 depicts a screen display of a management schedule for automatic notification procedures.

FIG. 17 shows a screen display of an administrative data entry form for establishing a new user on the system.

DETAILED DESCRIPTION OF THE INVENTION

Figure 1:
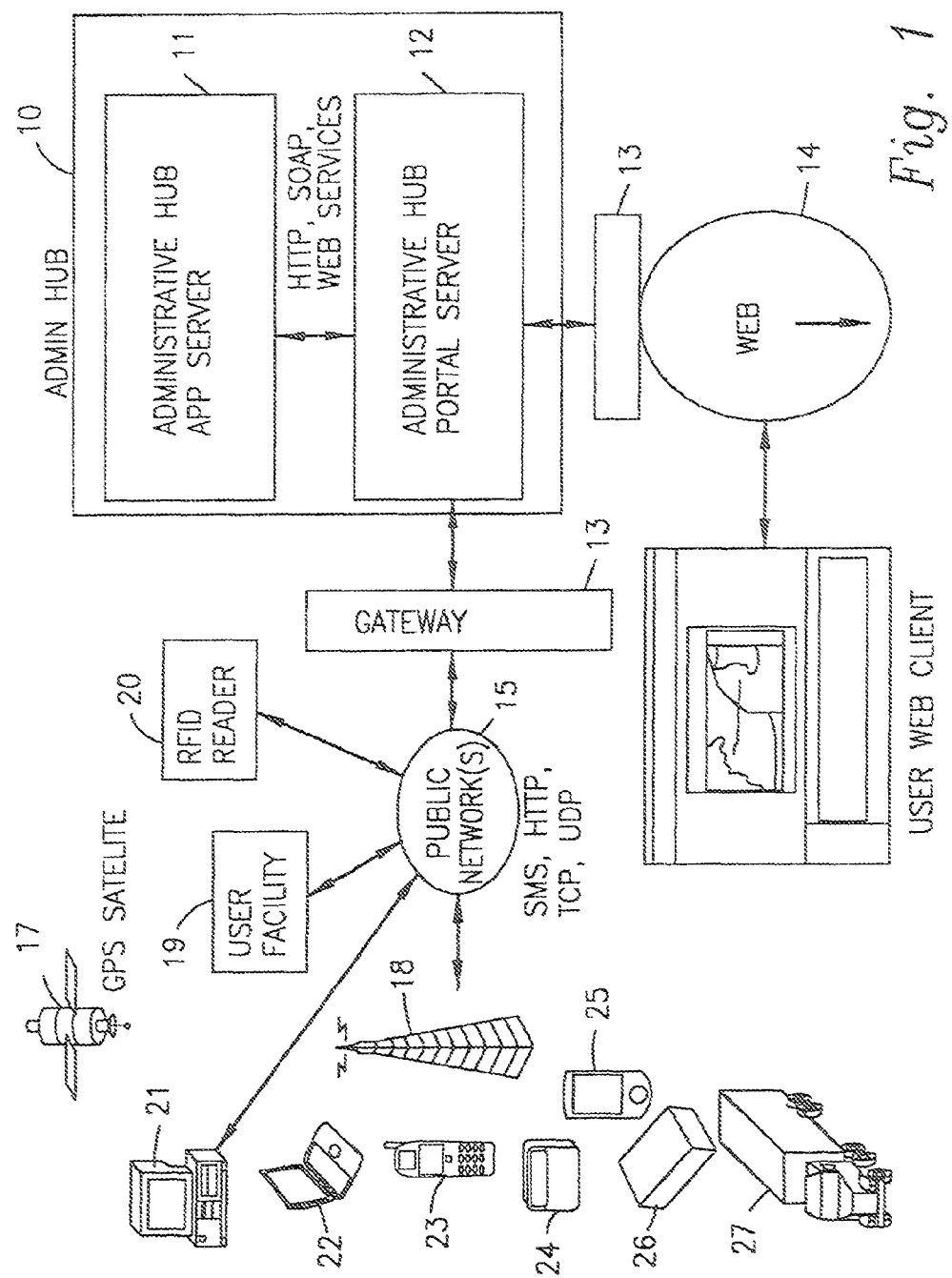
FIG. 1 is a schematic diagram showing the communication paths of components utilized in the invention.

Turning then to FIG. 1, a schematic overview of the communication path utilized in the present invention is illustrated. Control of the invention is preferably maintained at one or more administrative hubs 10 running application server 11 functionality and portal server 12 functionality. The portal server 12 will communicate through gateways 13, generally routers or a location aggregator, with the Internet 14 or some combination of public networks 15, possibly including the Internet, and telephone networks. Communications are then directed to and/or from a wide variety of devices with respect to the administrative hub 10. For instance, an RFID reader 20 may detect and report the presence of an RFID tag. The administrative hub 10 may generate a message to a controllable device user at facility 19 and receive a confirming acknowledgement. A user of the invention may obtain information via personal computer 21, laptop computer 22, cell phone 23, Blackberry 24, Palm Pilot 25 or other digital communication device. The tracking device may be in a wearable ankle bracelet box 26, installed in a vehicle 27, or operated on GPS enabled mobile communications devices such as Palm Pilots 25, Blackberrys 24, cell phones 23, or even on appropriately configured laptop computers 22. If the tracking software is installed on these or similar devices, then location information generated from GPS satellite 17 and confirmed by assisted GPS location data for cell tower triangulation, together with any other types of data collected by the mobile communication device, is periodically transmitted to the administrative hub 10. A user of the system with access via a web enabled device is able to graphically display a variety of tracking device information utilizing web client 16. In addition, the user may generate messages to the administrative hub 10 or to any of the described communication enabled devices.

Figure 2:
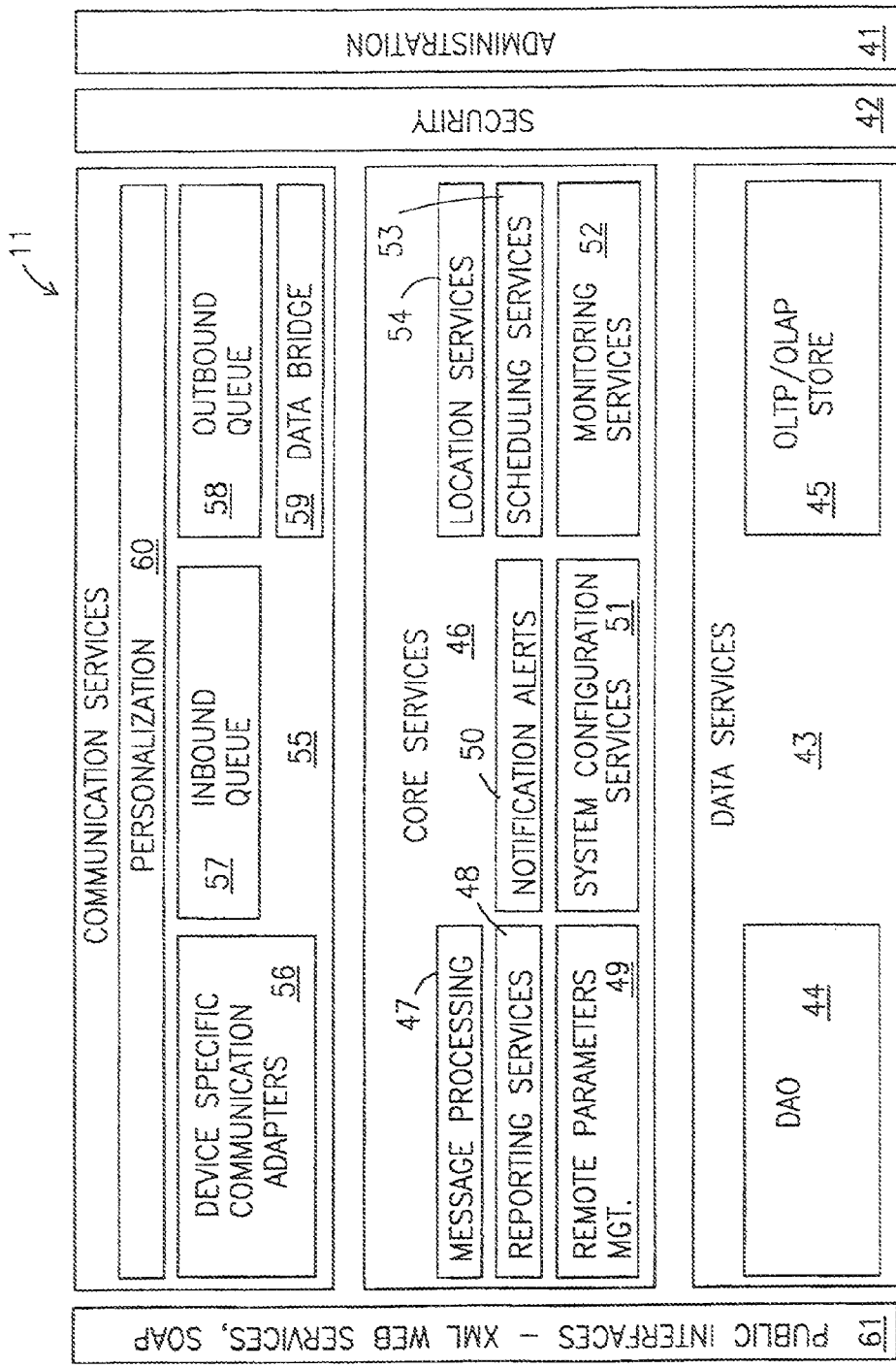
FIG. 2 is a block diagram of the functional architecture of an administrative hub server.

Turning then to an examination of the system components in greater detail, the logical architecture of a representative administrative hub application server 11 is shown in FIG. 2. This server has a standard administration 41 and security 42 functionality. The three principal categories of the services provided by the application server 11 are data services 43, core services 46, and communications services 55. Data services 43 include data housed in OLTP (Online Transaction Processing) or OLAP (Online Analytical Processing) relational or multidimensional databases 45 and data access objects (DAO) 44 to allow data access mechanisms to change independently of the code that uses the data. Core services 46 principally comprise message processor 47 for parsing and either acting upon or forwarding incoming messages for action and building and formatting outgoing messages in appropriate packet format; reporting services 48 for building reports from event logs stored in data services 43 and organizing the data for transmission to portal server 12; remote parameters management 49 for storing and managing parameters such as time intervals for a mobile unit to take location fixes and for initiating communications with administrative hub 10, and intervals for battery charge testing and reporting and battery charge requirements; notification/alerts 50 for configuring conditions that will generate alerts and reports, including persons to be notified for types of events, immediate or delayed timing for those notifications, and the communication methods to be employed in notifications; system configuration services 51 to hold parameters defining the system and user preferences which may include language choice, time zone, and the like; location services 54 to convert data from mobile units to position, and geocoding to or from a particular address, as well as performing assisted GPS location calculations and any necessary drift correction; scheduling services 53 for managing times including regular schedules for exclusion and inclusion zones, as well as special permissions or allowed variations from usual schedule, and required appointments at particular addresses; and monitoring services 52 for comparing reported locations against rules for the monitored individual's locations and generating appropriate information to the notification/alerts module 50 in the event of violations. The communication services component 55 includes inbound and outbound message queues 57, 58; communication adapters 56 to allow messaging with a variety of devices; data bridge 59 to permit data from core services to be formatted into outbound messages, and inbound messages to be formatted for access by core services 46; and personalization 68 to permit users to specify custom reports and preferred screen displays. Finally, an interface 61 such as XML protocol for accessing web services is provided.

Figure 3:
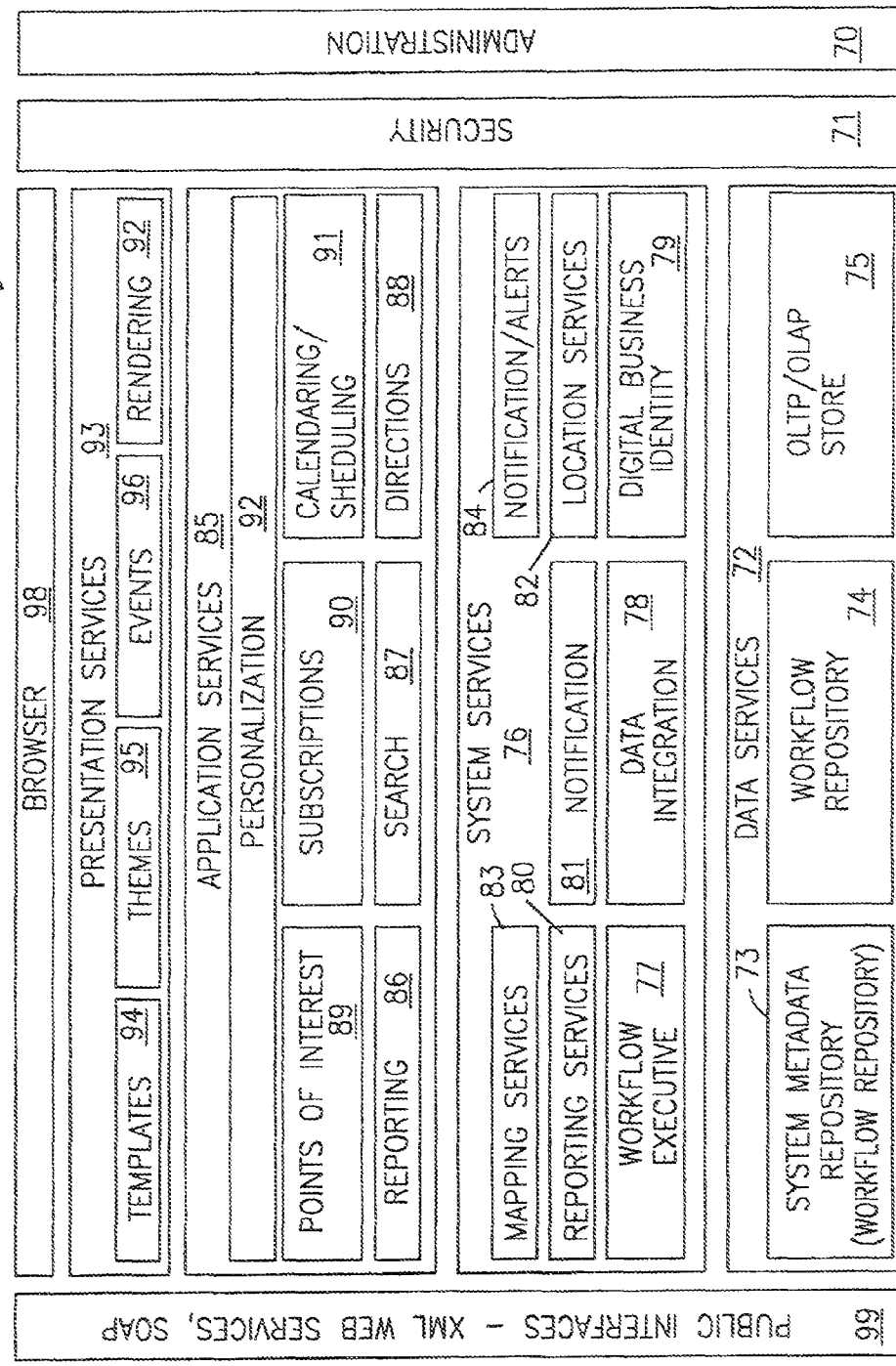
FIG. 3 is a functional architecture diagram of an administrative hub portal server.

FIG. 3 shows a similar logical architecture of an administrative hub portal server 12 which once more has standard administrative 70, security 71 and interface 99 modules. The principal functionality of portal server 12 may be divided into data services 72, system services 76, application services 85 and a browser 98. Data services 72 principally comprise a repository for data needed to reply to inquiries from users accessing the system using their web client 16 (shown in FIG. 1). Principal components of data services 72 include system metadata repository 73 holding information with respect to the system components so that they may be accessed when needed to carry out actions; workflow repository 74 queuing the actions to be carried out; and OLTP/OLAP storage 75. System services provide a number of modules corresponding to core services on the application server including reporting services 80, notification alerts 84, and location services 82. In addition, system services provide mapping services 83 for rendering locations on graphical maps, workflow executive 72 for parsing actions in the workflow repository 74 and commencing execution of those actions, data integration 78 for merging structured and unstructured data into a useful form such as XML for use by the system, and digital business identity 79 for holding user management information utilized by the system's access control logic. The application services 85 include display related personalization 92; search functionality 87; reporting 86; points of interest 89 for assigning descriptive names to physical locations in lieu of addresses; subscriptions 90 for allowing users to specify types of information to receive, such as whenever a new offender is added for monitoring, whenever a mobile unit is disabled, or other types of events separate from the violation type notification/alerts; directions 88 for facilitating navigation to locations; and calendaring/scheduling 91 to communicate schedule information with scheduling services 53 on application server 11. Presentation services 93, principally comprising templates 94, themes 95, and rendering 97, provide for enhanced screen displays presented in browser 98. Events 96 translates user keystrokes and mouse clicks into workflow actions.

Figure 4:
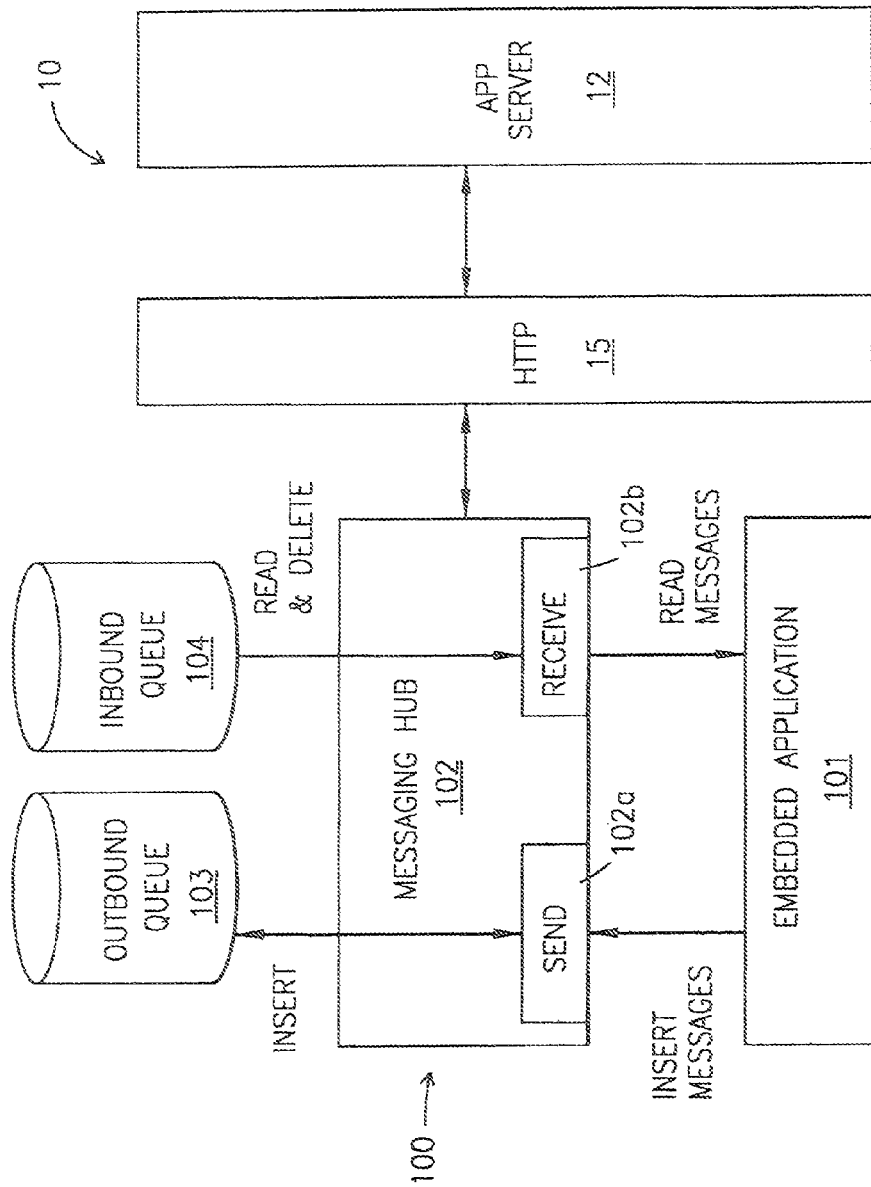
FIG. 4 is a schematic diagram reflecting the processing of communications by a portable device according to the present invention.

FIG. 4 shows an overview of messaging between application hub 10 and user device 100. A message may be generated by application server 12 and then communicated via Internet and typically public cellular network 15 to device 100 where it is inserted in the inbound message queue 104. Messages are then read into the messaging hub 102 which corresponds to communication services 114 shown in FIG. 5 and deleted from the inbound queue 104. Received messages are then processed for message type and appropriate message data is transmitted to embedded application 101 in the device 100. Similarly, the embedded application 101 may generate acknowledgement for messages which are transmitted to messaging hub 102, formatted and inserted in outbound message queue 103.

Figure 5:
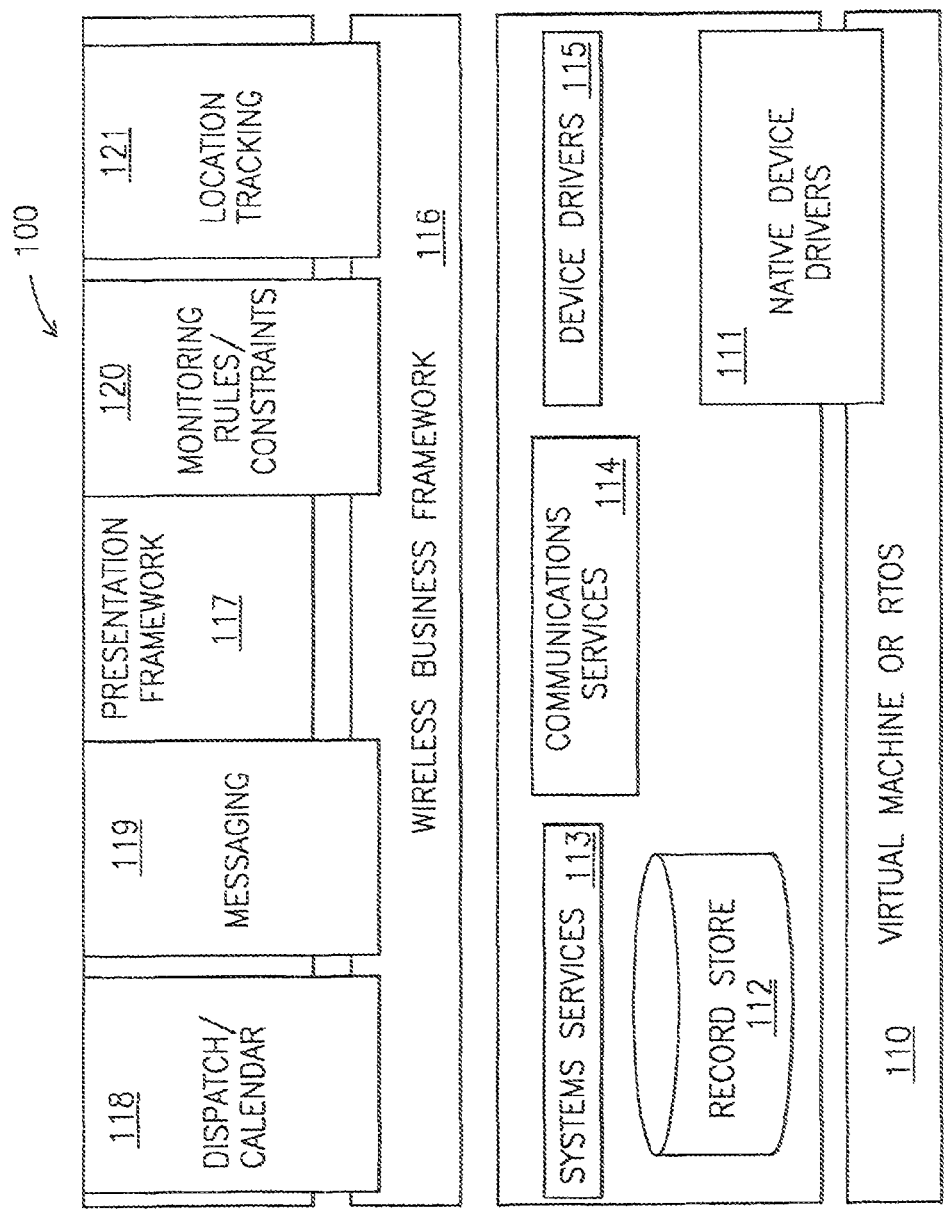
FIG. 5 is a functional architecture diagram of a wearable tracking device according to the present invention.

The logical architecture of a representative device utilized in the invention is reflected in FIG. 5. A preferred device uses a real time operating system (RTOS) or a virtual machine software implementation of a desired CPU and native device drivers 111 to permit operation of the system with a wide variety of devices 100. In even the more basic tracking devices typified by vehicle tracking 27 or offender tracking 26 devices, there are device drivers 115 to interface with much of the hardware shown in FIG. 6, systems services 113 to monitor device status 112 or to generate alerts, and communication services 114 to transmit stored data and alerts as described in connection with FIG. 8. Wireless business framework 116 implements the confirmed delivery of messages, as also explained in connection with FIG. 8, while presentation framework 117 contains dispatch module 118, which effectively is a calendaring or scheduling functionality, and messaging 119 which is only available on more advanced devices such as handhelds, phones with LED displays, or computers. Monitoring rules and constraints 120 are implemented to generate active monitoring notifications while location tracking 121 generates GPS and assisted GPS location data.

Figure 6:
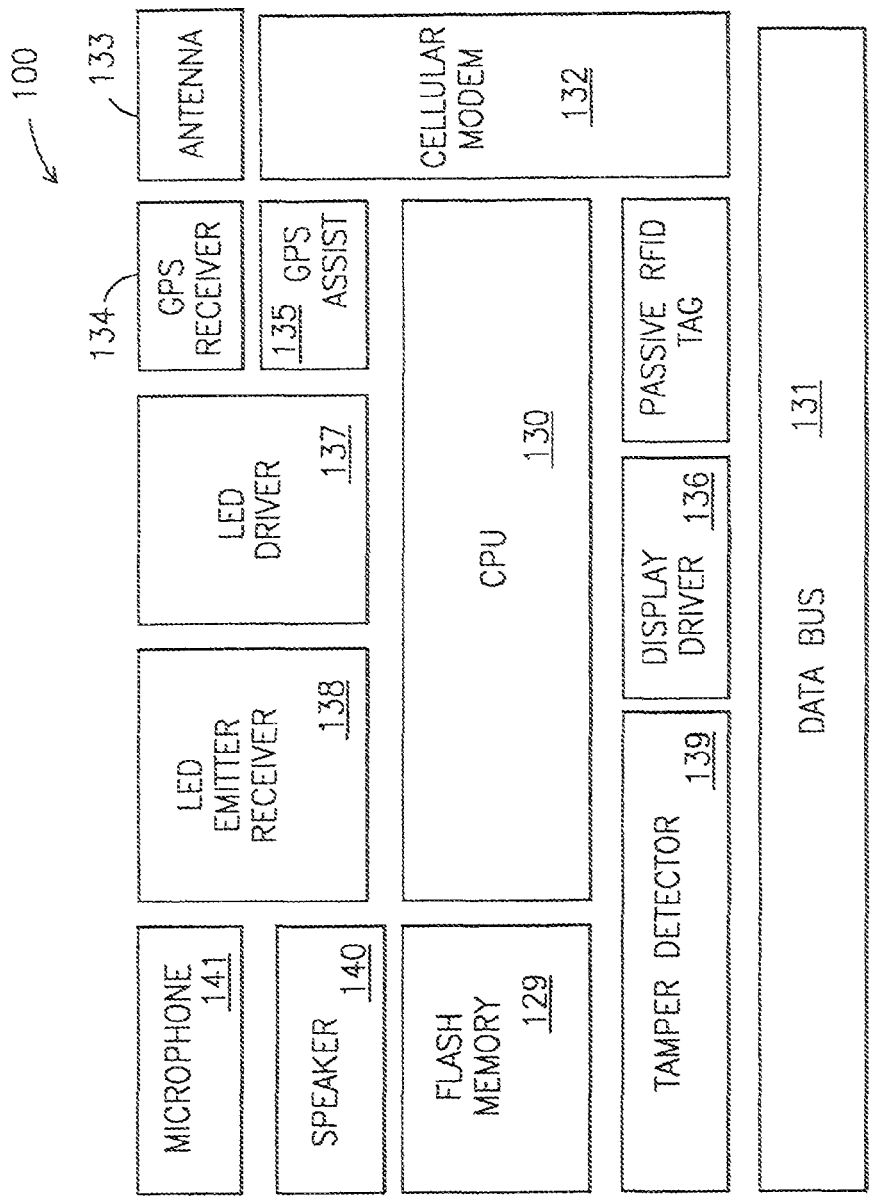
FIG. 6 is a high level electrical block diagram of a wearable tracking device according to the present invention.

FIG. 6 is a high level block diagram of a device 100 used in the invention. Typically, the device is based upon a GPS enabled cell phone, principal components of which are flash memory 129, CPU 130, data bus 131, cellular modem 132, antenna 133, UPS receiver 134, display driver 136, speaker 140, and microphone 141. The operating system or virtual machine software, as appropriate to the device, may be installed in flash memory 129 and operates in connection with CPU 130 to present a standard device profile to the system. Communications are transmitted from the CPU through the data bus 131 to cellular modem 132 and broadcast in the form of digital packets via antenna 133. Similarly, incoming messages travel in the reverse sequence. The GPS receiver 134 is utilized to generate location information. Because GPS location requires line of sight access to GPS satellites 17, and because GPS location is sometimes subject to erroneous results due to drift or temporary satellite misorientation, GPS assist 135 may be added to the device or the cellular network. Assisted GPS generates location information based upon signals received from nearby cellular communication towers 18 and is only accurate to within several hundred feet rather than the GPS location accuracy of only several feet. Nonetheless, assisted GPS provides valuable location confirming information as well as at least general location information when line of sight access to GPS satellites is unavailable. Alternatively, location information may be provided by a location aggregator. The location aggregation service may be provided by a cellular network provider or an entity operating a gateway in connection with the cellular network or other broadcast communication provider. Many cellular networks are now capable of determining the location of GPS enabled cellular handsets with some degree of accuracy, particularly handsets that facilitate assisted GPS such as those using Qualcomm 6050 or 6250 microprocessors which permits the network to use AFLT. While the 6250 microprocessor can operate autonomously to determine the co-ordinates of the handset, both of the Qualcomm processors can also operate in response to a cellular network query, or by generating a their own location query, to cause the network to acquire the GPS data received by the cellular handset, and to utilize Advanced Forward Link Triangulation (AFLT) or other cellular network information, to produce an assisted GPS geolocation for the handset. In a further refinement, the GPS and cellular network data may be processed by the location aggregation service for accuracy. For instance, location information data may be processed utilizing noise processing theorems to correct for bad data such as drift caused by a GPS satellite wobble, or the effects of changes in signal reflection and absorption caused by varying conditions such as locations in urban canyons, the woods, or beneath heavy cloud cover, and atmospheric ionization changes from day and night. Information as to the geolocation of the handset is then communicated by the location aggregator to the administrative hub, and in appropriate instances may also be communicated to the handset.

While the display driver 136, microphone 141 and speaker 140 may be disabled or removed from vehicle location 27 or offender bracelet 26 constructions, other hardware may be added. For instance, in the case of an offender bracelet 26, tamper detector 139 and LED driver 137 and LED emitter receiver 138 are added to provide redundant tamper indicators as explained below in connection with FIG. 7.

Figure 7A:
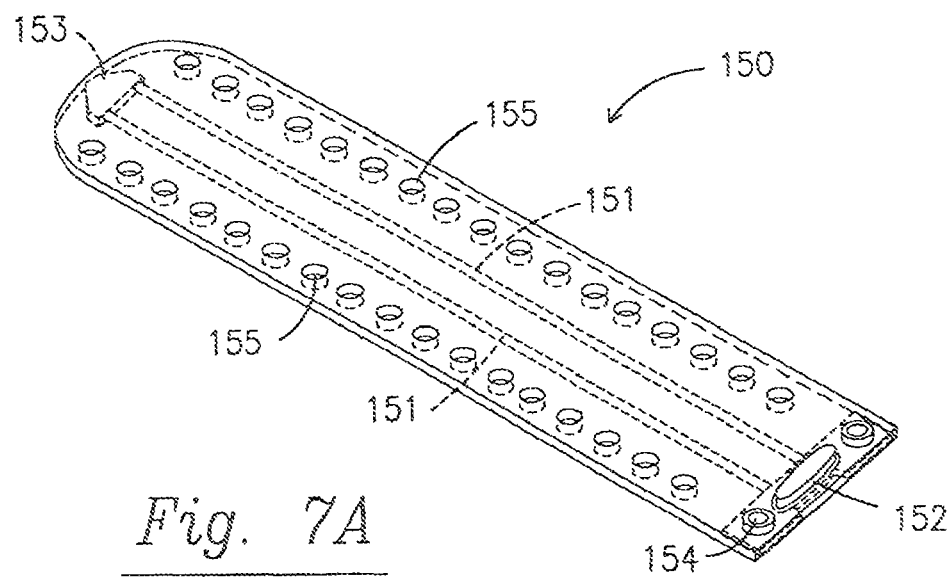
FIG. 7A is a perspective view of a tamper resistant strap for use with a wearable tracking device according to the present invention.
Figure 7B:
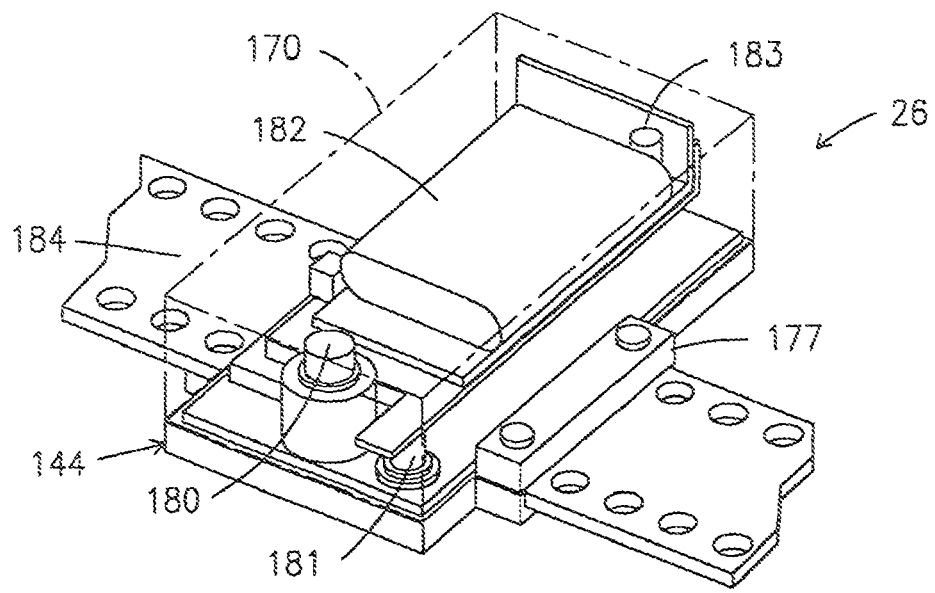
FIG. 7B is a perspective view of a wearable device according to the invention with strap affixed.
Figure 7E:
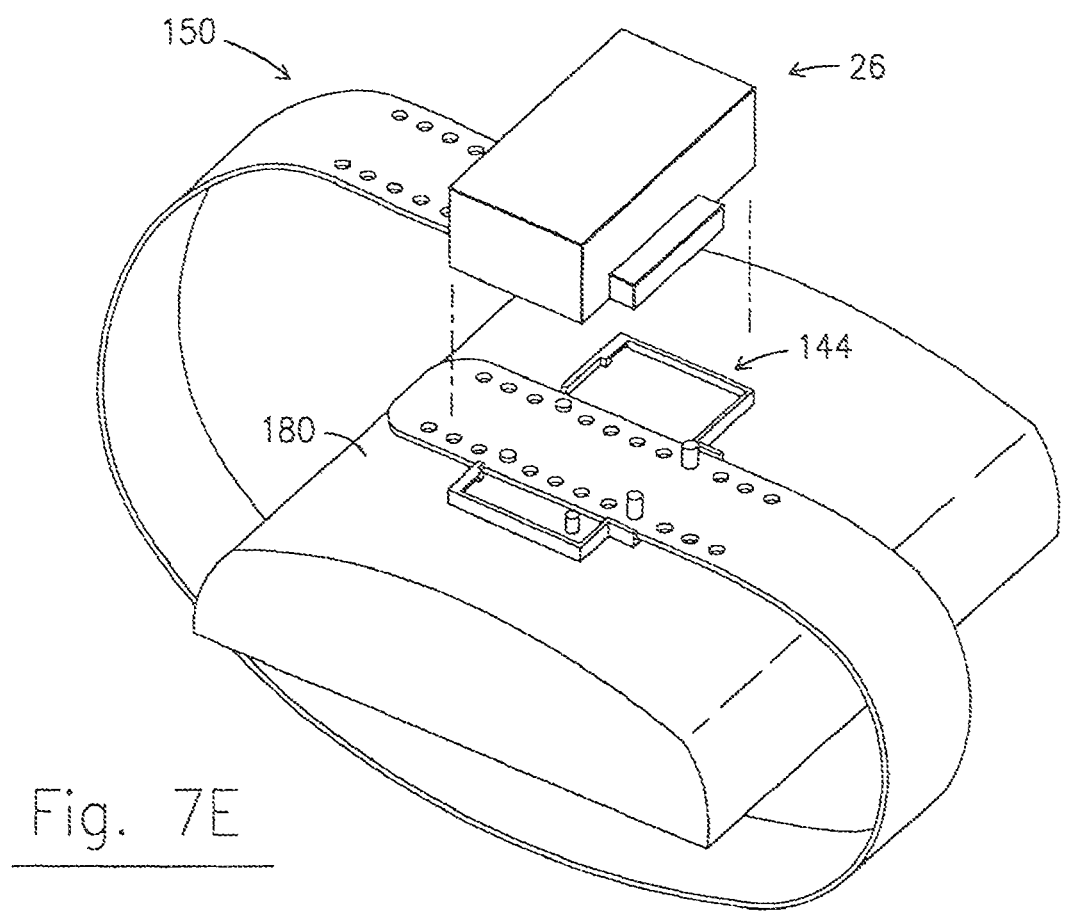
FIG. 7E is a perspective view showing the method of attaching a monitoring device of the present invention to the wearer's leg with the device, attached strap and lock bracket.
Figure 7F:
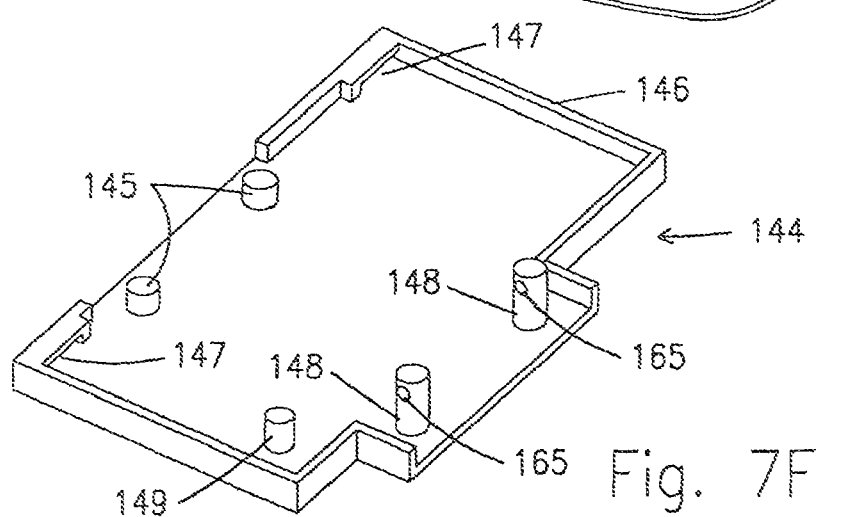
FIG. 7F is a perspective view of a lock bracket base according to the present invention in isolation.

A preferred offender tracking device 26 is illustrated in FIGS. 7A-7F. The principal components of tracking device 26 are lock bracket 144 as shown in isolation in FIG. 7F, a strap 150 shown in isolation in FIG. 7A, and main housing 170 shown in bottom view in FIG. 7D and top phantom view in FIG. 7B. Turning first to the strap 150 of FIG. 7A, a representative strap 150 might be manufactured from plastic molded over optical cable 151 and light guide 153. The strap will preferably have a light guide/connector 152, apertures 154 to accept fasteners, and apertures 155 to receive locking posts. An alternative strap design includes a flexible battery within the strap. Optical cable 151 may still be included in the strap 150, and significant power resources for the device can be located within the strap. This results in the main housing 170 no longer having to contain the entire power supply, and by utilizing a smaller battery within the housing, the size of the housing may be reduced, resulting in a device that is more easily worn. An exemplary battery technology that may be employed in such a strap is a thin flexible battery using NECs organic radial battery technology. Turning then to FIG. 7D, it can be seen that fasteners 156 have been received through apertures 154 of strap 150 and thereby fasten the strap 150 to bottom of main housing 170. As shown in FIG. 7B, main housing 170 contains recharge connector 180, tamper sensor switch 181, battery 182, antenna 183, and generally the components 184 reflected in FIG. 6. When used without a power strap, the battery 182 is preferably a long life battery which has a life of up to approximately 21 to 30 days when used for offender monitoring in monitoring units having current efficient circuitry and antenna design, and effective power management algorithms to minimize the number and duration of transmissions from the unit and the intensiveness of calculations carried out in the mobile unit. This permits monthly visits to a probation officer with the necessity of recharging the battery by the offender only once, if at all. When used with a power strap, the battery in the strap 150 preferably has these long lived characteristics, and the battery 182 within the housing 170 may be simply a short term back-up power supply, to operate the device temporarily if the power strap is damaged or disconnected. The storage in device 100 is sufficient to store messages and GPS location recordings for up to about two weeks depending upon the frequency with which GPS location readings are recorded. The bottom of main housing 170 in FIG. 7D shows a variety of features including opening 171 for tamper sensor 181, opening 172 for recharge connector 180, rearward facing hooks 173, lens opening 174 to transmit light from a diode to the light guide connector 172 of strap 150 and forward lip 175 defining cavity 176. The side walls for cavity 176 have apertures 177 to receive locking pin 160 shown in FIG. 7C. To attach the device 26 as shown in FIG. 7E, the lock bracket 144 is placed on the offender 190. Accordingly, the bottom surface of the lock bracket 144 is preferably made with comfortable to wear surface. The top surface of lock bracket 144 has an outer flange 146 to receive housing 170 and a plurality of upstanding pins. At one end are two relatively short pins 145 that interface in the strap openings 154 that receive fasteners 156. At the opposite side of the face of lock bracket 144 are two taller pins 148 that are received in apertures 155 of strap 150 after it encircles the offender's arm or leg 190. These taller pins 148 have lateral apertures 165 to receive the locking pin 160. Also shown is pin 149 that is received in aperture 171 to activate the tamper sensor switch 181. Thus, to fit the device 26 to the offender, lock bracket 144 is placed on the offender's leg 190. The light guide connector 152 end of the strap 150 is secured to the housing 170 as by screws 156. The strap 150 is placed so that the unattached end is received over posts 145, 148. The strap is then wrapped around the offender's leg 190, and the main housing hooks 173 are received in flange recesses 147 on lock bracket 144, while posts 148 extend upward into cavity 176. Then locking pin 160 is passed through openings 177 and pin holes 165 so that the pin head 163 extends from one side of front lip 175 and base 161 extends from the other side with lateral section 162 extending therebetween. In the event that the offender should attempt to remove the pin 160, it will break at breakpoint 164 and the tamper detector will be activated. Similarly, if the optical cable 151 of strap 150 is cut, the tamper detector will be activated. Finally, if the main housing 170 is removed from lock bracket 144, the tamper sensor switch 181 will be activated. In any of these instances, the device 26 will generate a message to the administrative hub 10 advising of the tampering event. An effective tamper detector to ascertain whether there has been a breach of the housing 170 may combine a light sensor that is activated when light enters the housing and an electromagnetic field sensor that is activated if metal components of the housing are dislocated. A sophisticated tamper detector used with the optical cable may utilize an LED driver 137 and one or more LEDs to emit at least two different frequencies of light in alternating or random sequence through the lens opening 174 into the light guide connector 152 and outbound on a first length of optical cable 151 to light guide 153 and back inbound on the second length of optical cable 151. Simultaneously, the LED receiver is informed of the frequency being emitted, and if either no light or the wrong frequency light is detected inbound, then a tamper alert is generated.

It will be appreciated that in securing the device 26 to an offender, it is not necessary to cut strap 150. Instead, the strap will fit a substantial range of offender leg sizes and requires no special tools to secure the unit on the offender's leg. Prior art devices have generally required the strap be cut to length and in the event that optical cable is utilized for tamper indication, the difficulties of accurately splicing the cable not only requires special tools, but also is likely to be sufficiently defective that false tamper alerts may be generated. Furthermore, when the device is removed from an offender, only the pin 160 is destroyed, so that the strap 150 may be reused.

Figure 8:
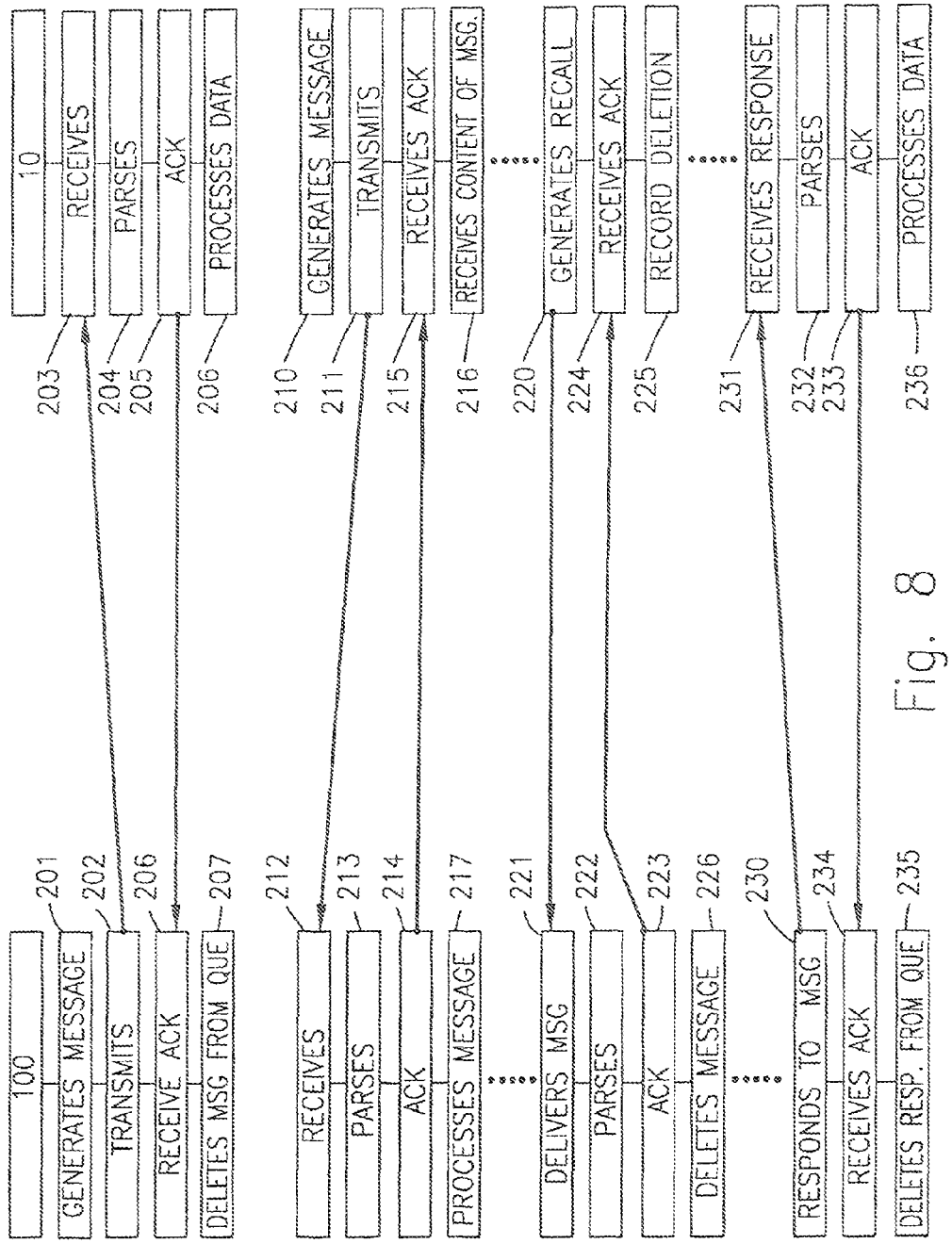
FIG. 8 is a schematic and flow chart reflecting a confirmed communication protocol that may be implemented according to the invention.

Turning then to FIG. 8, the messaging protocol providing for confirmed messaging is illustrated. First, a device 100 generates message 201. This message may be generated as a result of an alarm condition such as tampering, low battery, or entry into an exclusion zone, or alternatively may be simply a regularly scheduled transmission of location data as the device will be configured to take location readings periodically, typically in intervals of about one to five minutes, and to transmit those readings in batches, typically about every thirty minutes, preferably in a proprietary data packet. Such a data packet preferably has a header identifying message type, a security token, and message data. After the device 100 generates message 201, the message is transmitted 202 and received 203 by administrative hub 10. The data packet is parsed 204 to confirm a message type, the sending device, that security protocol is satisfied, and to determine that the data is not corrupt. Administrative hub 10 then sends an acknowledgement 205 to device 100 which receives the acknowledgement 206 and deletes the message from its outbound message queue 207. If the administrative hub determined the message was corrupt, it would request that the message be resent. If the device 100 did not receive an acknowledgement within a predetermined time period, it would resend the message.

It is also possible for messages to be generated at the administrative hub 10. These messages might actually be entered by systems personnel at the administrative hub 10 or by monitoring personnel interfacing with the administrative hub via user web client 16 or other suitably enabled device. Accordingly, a typical message generated might be from a probation officer advising an offender with a display equipped monitoring device that he has a court date at a particular time and place; or a message from a dispatcher to a pickup/delivery vehicle advising of an additional address to include on a route; or an administrative change to redefine an exclusion zone or alter a parameter of operation such intervals for taking and reporting location readings. Once the message is generated 210, the messaging hub transmits 211 the message which is received 212 by device 100. The device 100 parses 213 the message for message type and confirms appropriate security token is present and that the message is not corrupt. Then the device 100 generates an acknowledgement 214 which is sent to messaging hub and received 215. The administrative hub 10 then records confirmation that the message was received by device 100. The device 100 proceeds to process the message data 217.

When the administrative hub 10 is messaging device 100 with user display means such as a LED screen, messages may be sent which request a response. For instance, probation officer might ask an offender if he needs a ride to a court hearing. A dispatcher might ask a delivery/pickup person if he can make an extra pickup or delivery, and in either case request a reply. In the event that the message is received by the device 100 but there has been no reply, it is possible for the administrative hub to issue a message recall 220. When that recall is received 221 by device 100, it parses recall message 222, generates an appropriate acknowledgement 223, and proceeds to delete the message. The administrative hub receives the acknowledgement 224 and records the deletion of the message 225. Alternatively, if the device user responds to the message 230, the response is sent to the administrative hub 10 and received 231. Then the response is parsed 232 and acknowledged 233, and the administrative hub proceeds to process the data in the response, perhaps informing a dispatcher that the requested pickup or delivery has been accepted by the pickup/delivery driver. The device 100 receives the acknowledgement 234 and proceeds to delete the response from its messaging queue 235. Thus, the invention provides for a robust two-way messaging system with confirmed messaging delivery and message recall capability. The administrative hub 10 has the capability of sending inquiries to the device 100 in order to return information regarding device status and location information.

Figure 9A:
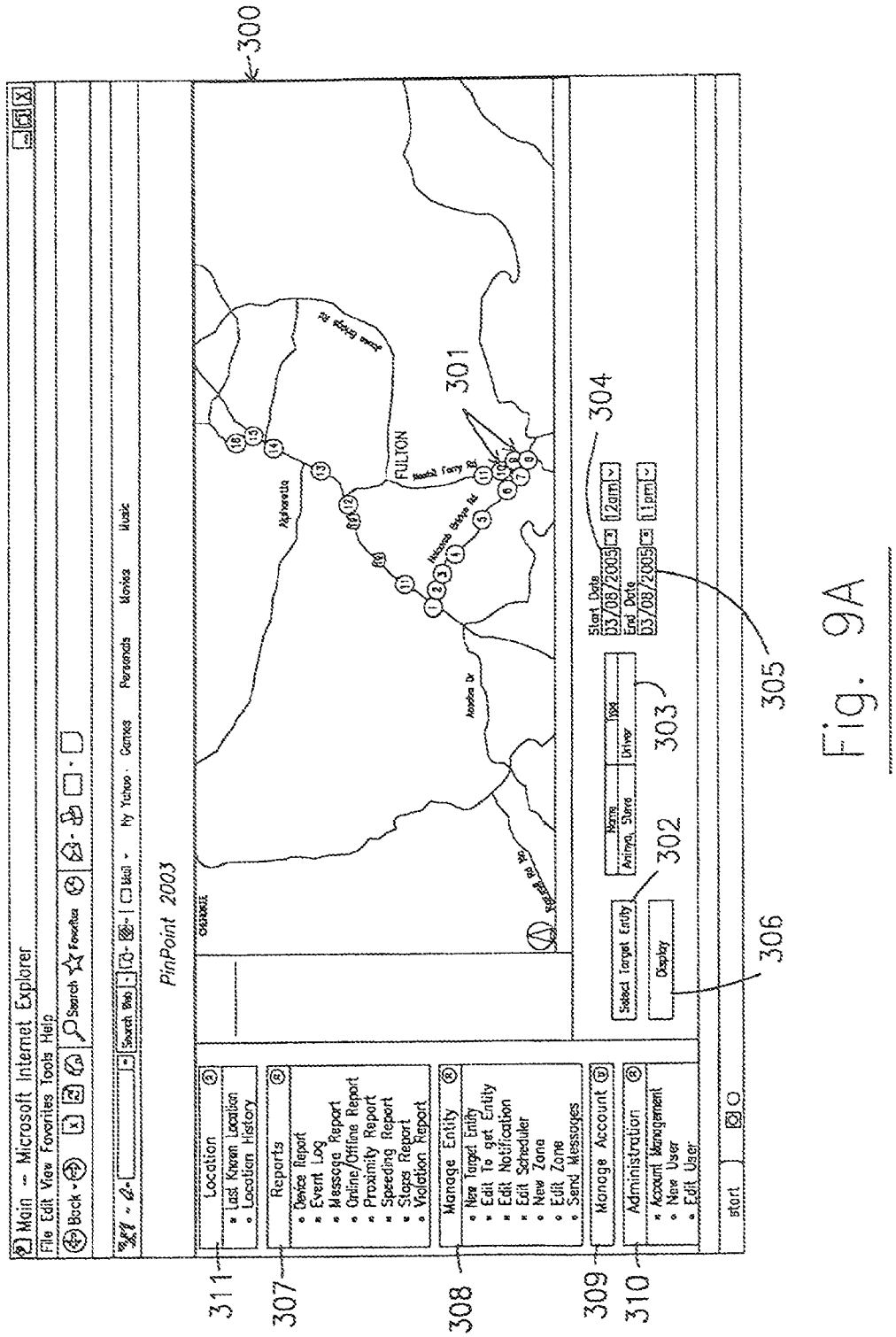
FIG. 9A is a screen display of a graphical location history map that may be generated with location data provided by the invention.
Figure 13:
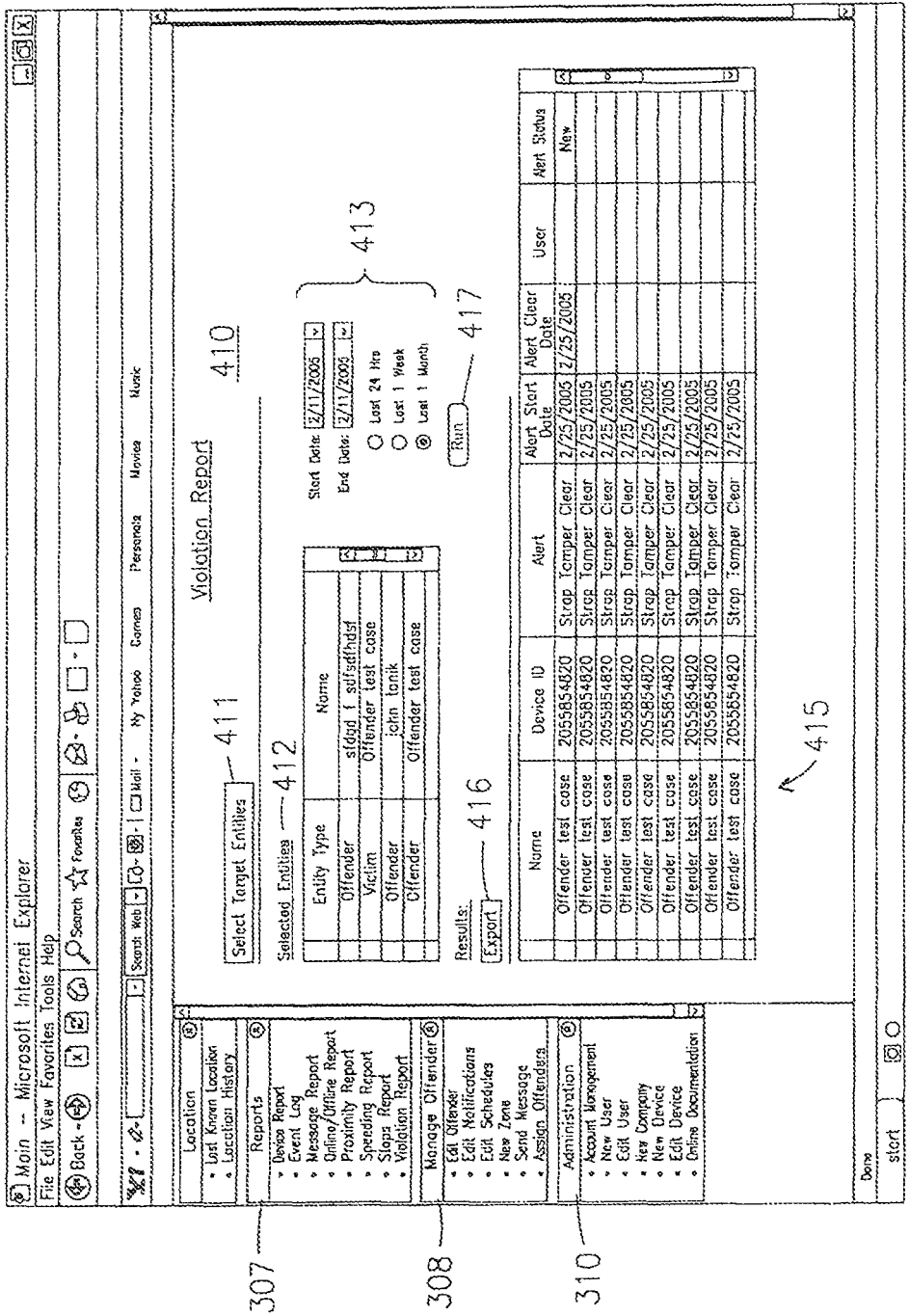
FIG. 13 is a screen display of a representative violation report that may be generated when utilizing the invention of the present system to monitor offenders subject to restrictions.

FIGS. 9 and 10 display a user web client 16 such as would be available to a probation officer or dispatcher utilizing the invention. FIG. 9A discloses a location history map 300 with indicators 301 showing the locations of a tracked individual over time. To utilize this reporting functionality, a location history is selected in the location menu 311. The target entity is selected 302 and displayed 303. Starting time 304 and ending time 305 are entered and display 306 generates the appropriate mapping. The location history can also be generated in a text popup screen 315 with text entries 316 corresponding to numbered indicators 301 on the map screen 300. The text route history may be exported 317 into a digital file or document for use apart from the device management and interaction software. As shown in FIG. 9A, additional types of reporting and functionality are also available. Report menu 307 provides for the creation of device reports that could include items such as battery power, battery charging events, device tampering attempts, and the like as reflected in greater detail in FIG. 14. An event log may be created listing a variety of different types of events that may have transpired; a message report lists messages between a user and the device; an online/offline report lists the times that the device was not within a reporting area; and a proximity report provides data concerning the device's proximity to a particular location or another enabled device. A speeding report extrapolates the device speed between location reports and lists instances when the distance between way points indicates a speed in excess of a user designated limit. A stops report indicates locations where the device has remained stationary for a user-determined interval. A violation report as shown in FIG. 13 lists instances in which the device wearer has entered exclusion zones or deviated from established routing. Additional menus 308, 309, 310 are provided for management and administration functions discussed below.

Figure 10A:
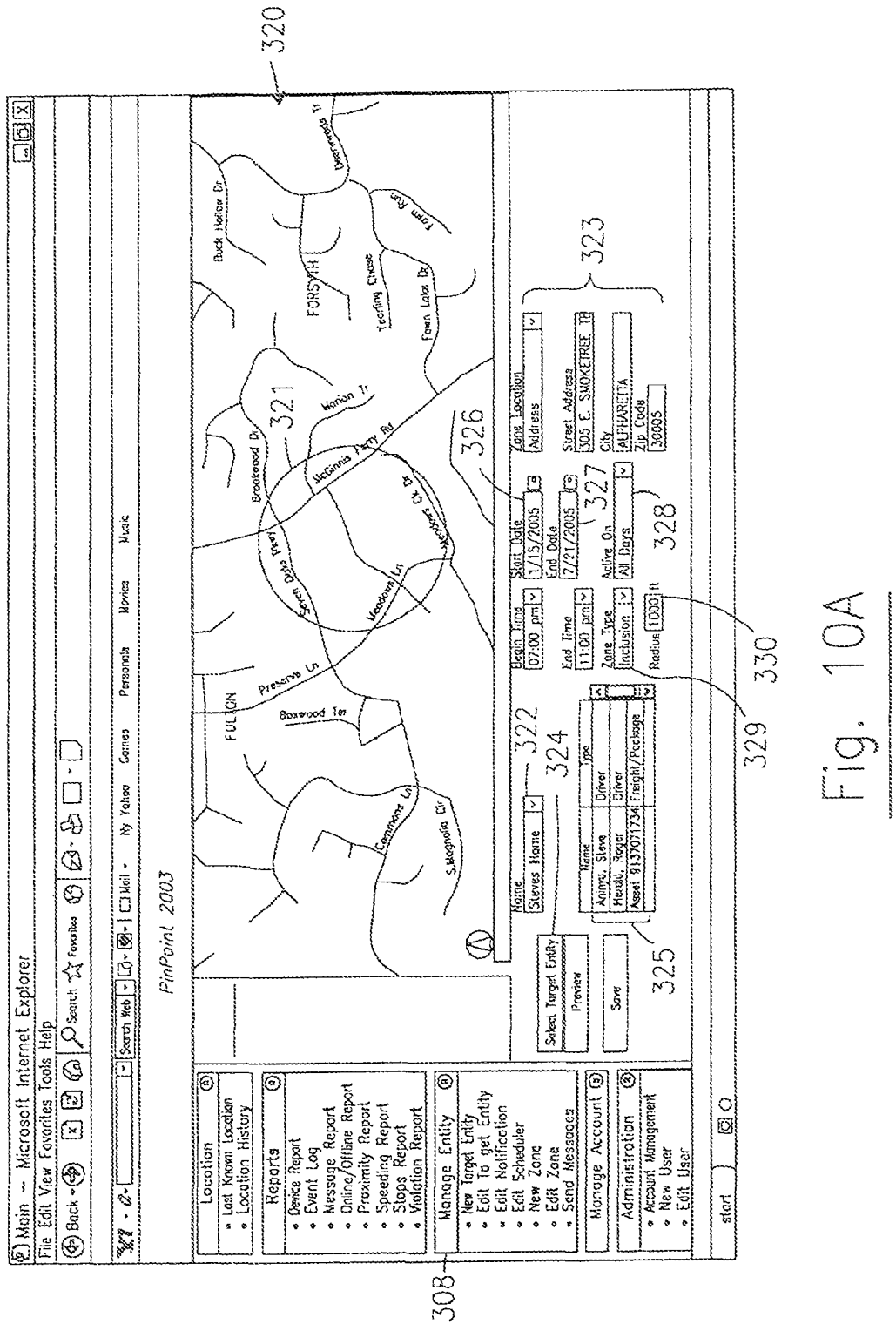
FIG. 10A is a screen display of graphical map of an inclusion zone defined according to the present invention.

FIG. 10A shows an inclusion/exclusion zone map 320 with defined inclusion zone 321. In the manage entity menu 308, new zones may be added and applied to target entities or existing zones may be edited. For a stationary zone such as inclusion zone 321, an address is entered 323 and named 322. Target entity is selected 324 and displayed 325. The zone has a starting time 326 and ending time 327 as is appropriate for offenders with a probationary term. The zone may be made active on all or selected dates 328, and the radius of the zone defined 330. In addition, the zone may be defined as inclusion or exclusion type 329.

Two particular advantages of the present invention are the ability to define buffer zones and mobile exclusion or inclusion zones. Relative to mobile zones for instance, inmates on a work crew may be assigned to an inclusion zone within a defined radius of a supervising corrections department official. The official will carry a device that is tracked by a administrative hub 10 as the official moves about. Any inmate whose device leaves the inclusion zone about the official's device generally causes alerts to be sent with tracking data so that the inmate may be apprehended. Similarly, an offender subject to a restraining order not to come within a certain radius of a victim may be equipped with a location device 100 and the victim also equipped with a location device, preferably by simply installing the necessary software on a GPS enabled cellular phone. The system then tracks the mobile locations of both the offender and the victim and sends appropriate alerts to one or more of the victim, the offender, and monitoring officer. In addition, the present invention provides for the creation of buffer zones that are not strict inclusion or exclusion zones. For instance, an offender might be subject to a 500 foot exclusion order, that creates a 500 foot exclusion zone around the victim and the victim's home and place of work. The system permits the definition of a larger buffer zone, perhaps 1000 feet or a quarter mile in radius, and if the offender lingers in the expanded buffer zone beyond a user designated time period, perhaps thirty minutes or an hour, notification is sent to a monitoring officer or included in reports.

Figure 10B:
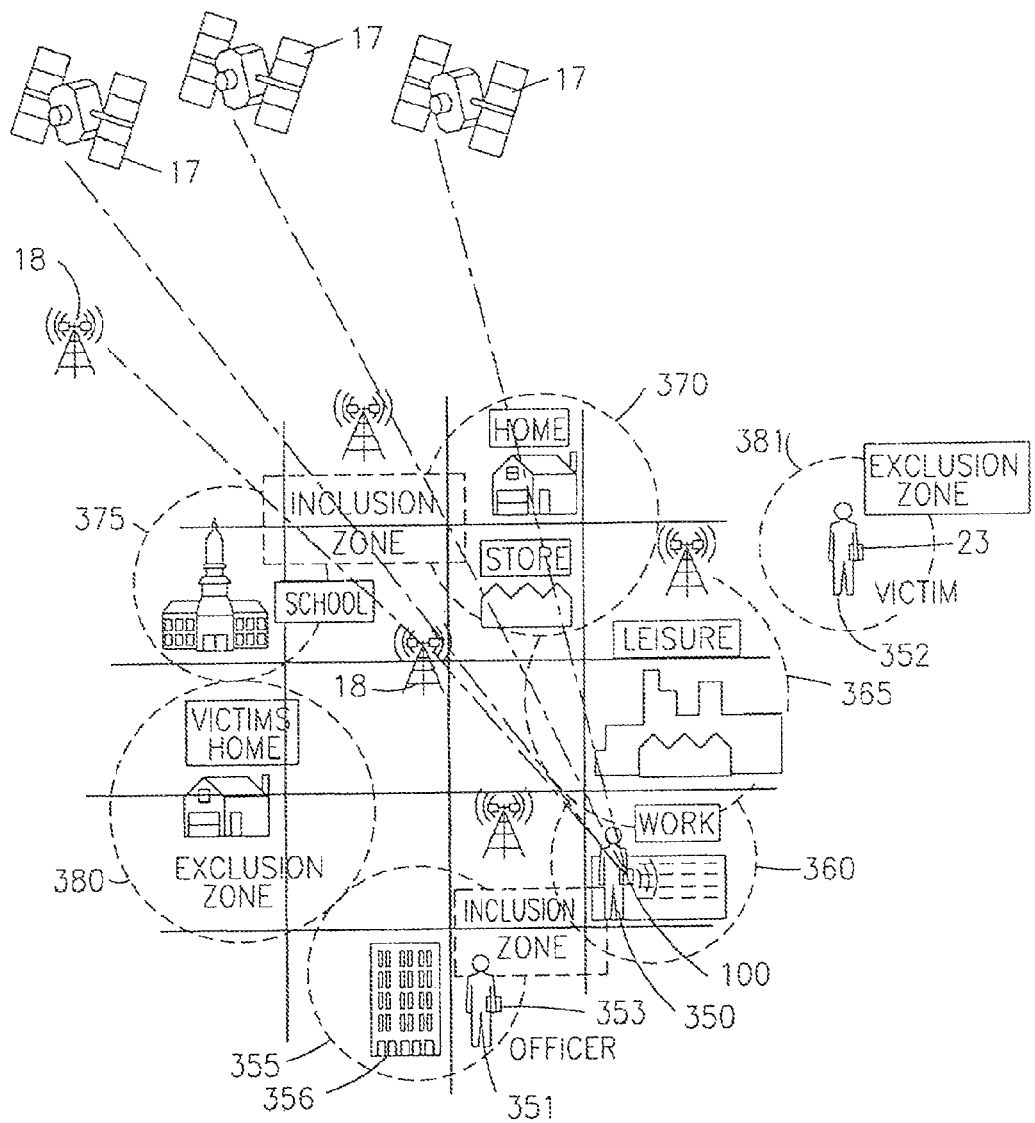
FIG. 10B is a schematic representation of inclusion and exclusion zones.

FIG. 10B illustrates inclusion and exclusion zones in operation. Specifically, an offender 350 is equipped with tracking device 100. An officer 351 is also equipped with a communication device 353 which might be sending communications to an enabled device ranging in sophistication from a cell phone 23 to a laptop computer 22, or the officer 351 may even be within a corrections facility 356 equipped with a work station 21 running web client 16. Generally, the corrections facility 356 would be within an inclusion zone 355 to permit the offender 350 to report for monthly probation officer meetings. In addition, the offender 350 would frequently be provided an inclusion zone 360 on workdays during work hours for his place of work. In some instances, the offender 350 would be allowed an inclusion area 365 for some leisure activities during selected hours, inclusion zone 370 for his place of residence and shopping needs, and if attending classes an inclusion zone 375 to attend school. An exclusion zone 380 would be established around the victim's home and possibly the victim's place of work. In addition, according to the present invention, victim 352 may carry a GPS enabled cell phone or other device running software according to the present invention and have a mobile exclusion zone 381 that moves with the victim's location. Thus, if the victim 352 were in one of the offender's 350 inclusion zones, then the system may generate notices to any of the victim 352 to advise of the proximity of offender 350; to the offender 350 to advise that the usual inclusion zone is not currently permitted; or to officer 351 to alert the officer to the developing situation so that corrective action may be taken.

Figure 11:
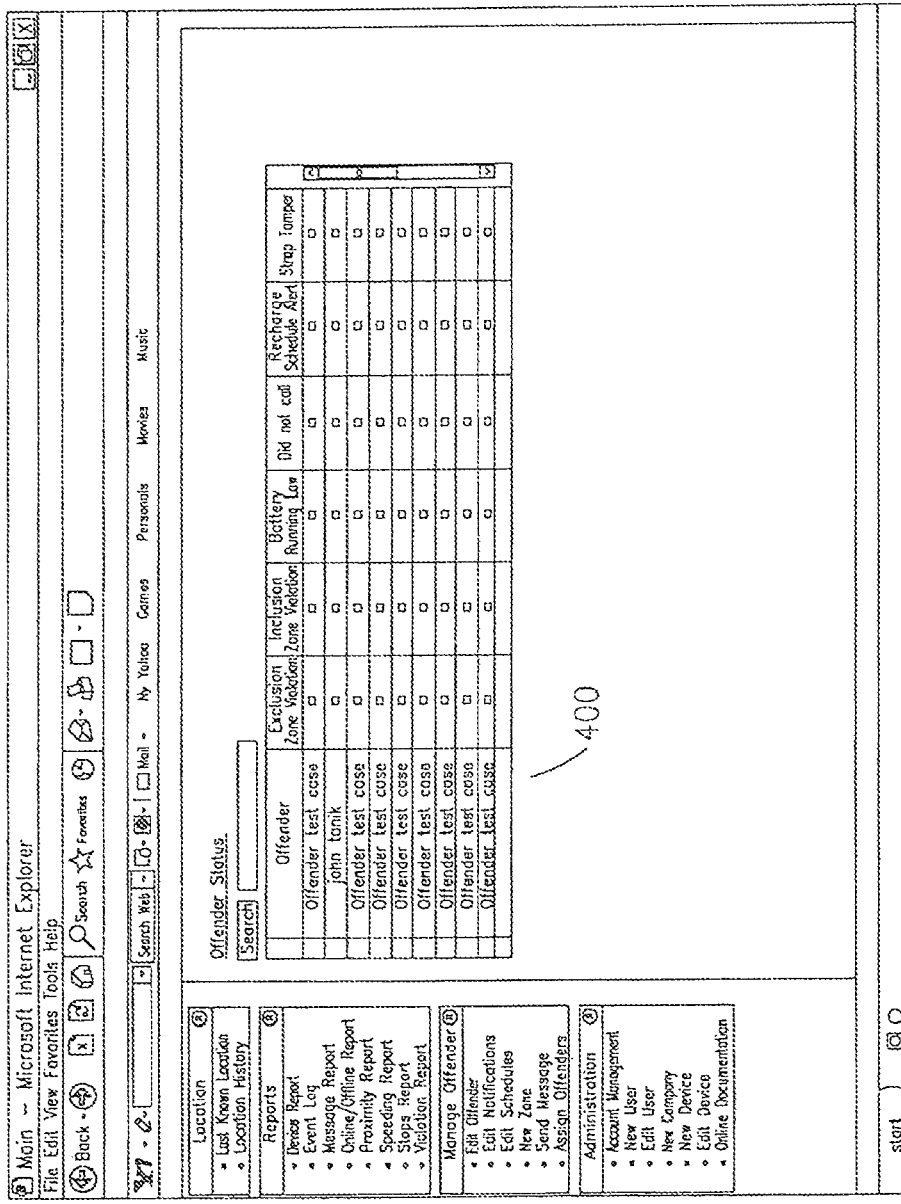
FIG. 11 is a screen display of a status report for individuals being monitored according to the present invention.

FIG. 11 shows a useful management report 400 for a probation officer or other corrections official with monitoring responsibility. The report lists offender status by user defined criteria, and in the illustrated case those criteria are of zone violations, battery status and recharge scheduling, failure to call in when required, and strap tampering events.

Figure 12:
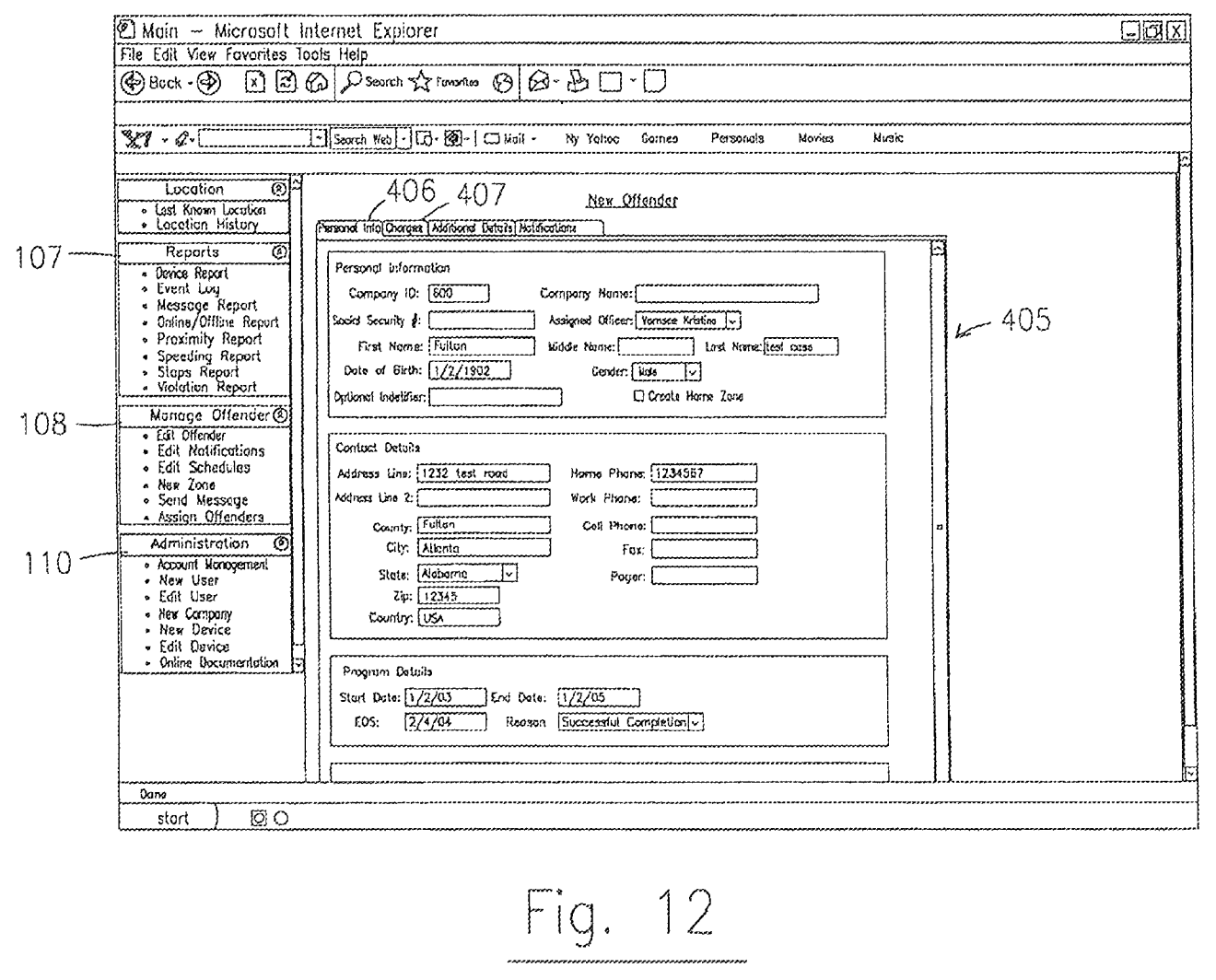

FIG. 12 shows the new offender data entry template 405 which is generated by the new offender item or manage offender menu 308. As shown, the new offender template has tabbed 406, 407 pages to permit the entry of personal information, charges, additional offender details and notifications. Adding new offenders is typically a user administrative function that may be accomplished over user web client 16 shown in FIG. 1.

FIG. 13 shows a violation report which is produced from report menu 307. After violation report activity is selected, the user selects the entities or offenders upon which the report is to be generated 411 and those entities are displayed 412. The user also selects the interval 413 over which the violations are to be displayed. When the report is run 417, text report 415 is generated. The report may be exported 416 to a digital file or document for use outside the monitoring and tracking system.

Figure 14:
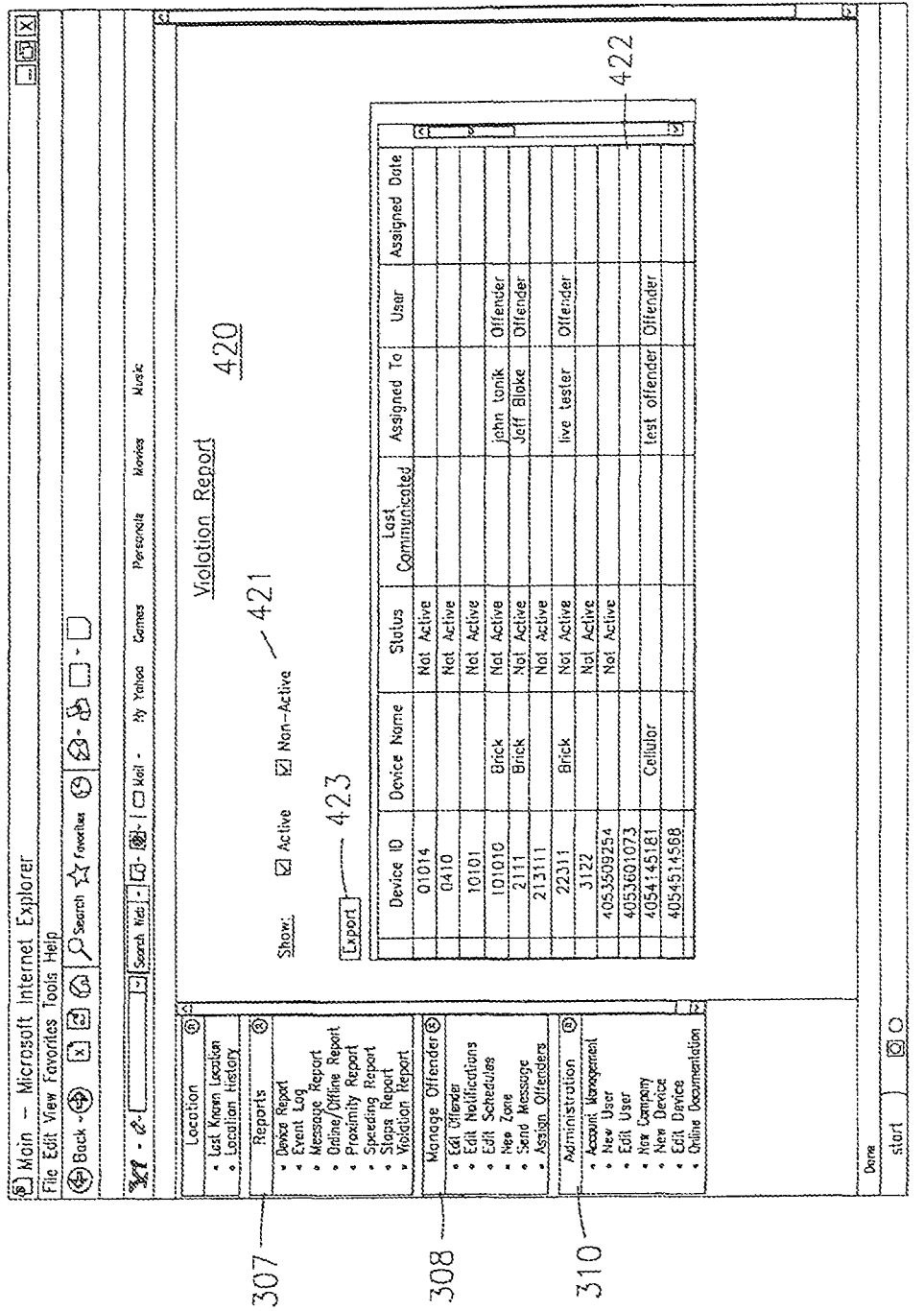
FIG. 14 is a screen display of a representative device report for devices being monitored according to the present invention.

The report menu 307 also permits generation of device report 420 shown in FIG. 14. From this report, the user can select active or nonactive devices 421 or both, and a report is generated showing device ID and type, such as an offender ankle bracelet, cellular phone, or the like, and other pertinent device information. A text report 422 can be generated, and the data in the report may be exported 423 to a digital file or document for use outside the tracking system.

Figure 15:
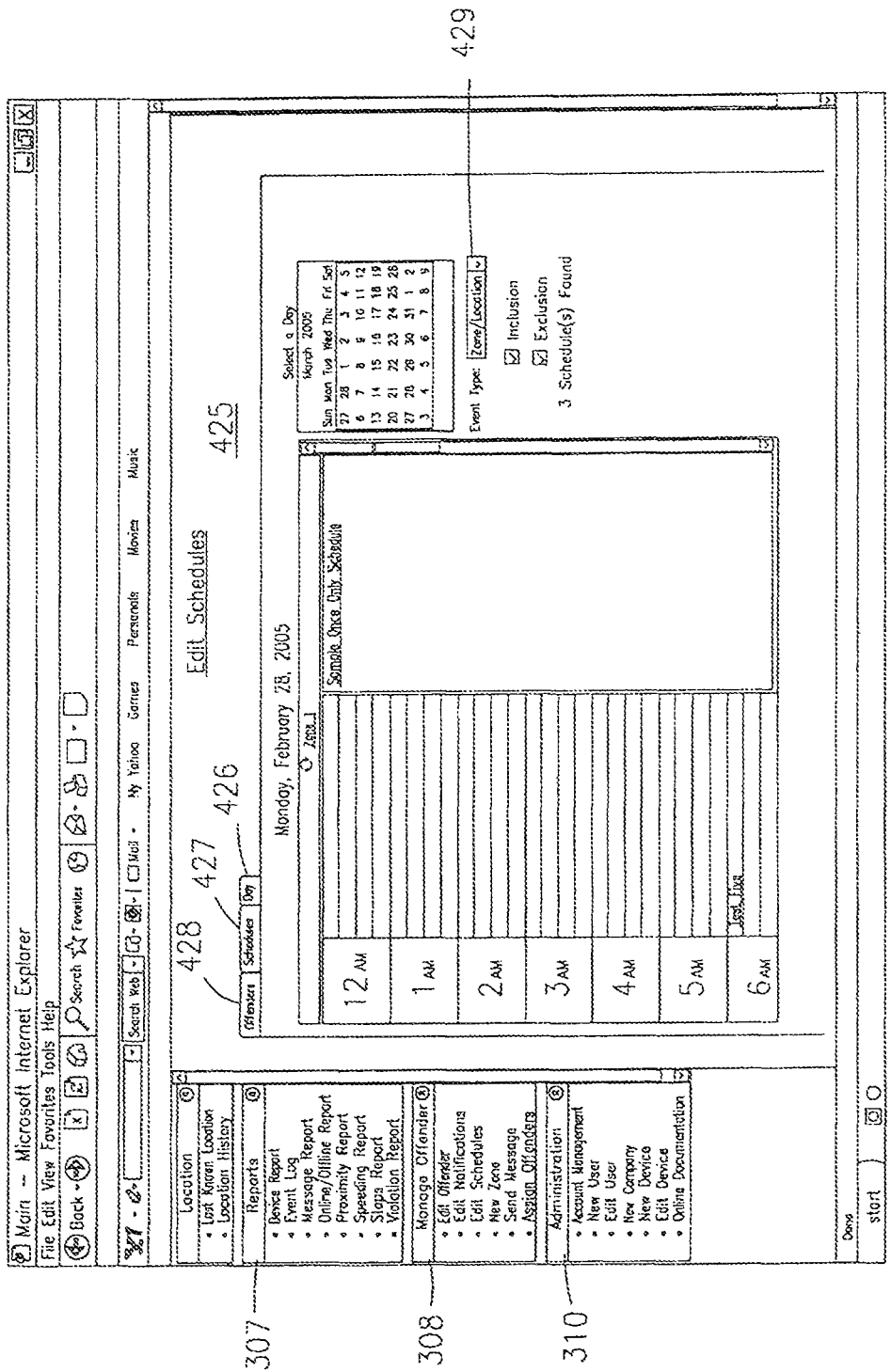
FIG. 15 shows a screen display of a management function template for editing schedules.

The manage entity or offender menu 308 permits entity schedules to be edited. FIG. 15 shows the edit schedule template 425 whereby utilizing tabs 426, 427, 428 offenders and their schedules may be selected and entries for particular days may be edited with event types 429, which may be appointments or particular time periods for application of inclusion or exclusion zones. In the administration menu 310, authorized administrative personnel may perform necessary updates such as managing various agency accounts, authorizing new agency or company users, editing existing user information, adding new agency or company accounts and editing account information, and adding new devices or editing device information FIG. 16 displays an edit company report showing company notification defaults 430. This allows the agency, such as a probation department subscribing to the service to designated parameters to the administrative hub 10 specifying communications methods 432 to be employed upon the occurrence of selected events 436 with respect to the agency 431, to a responsible officer for a particular offender 435 and to a victim or other interested third party. Illustrated communication methods include by fax, pager, e-mail, and SMS text messaging, and messages may be sent immediately 433 and/or provided in summary 434.

Figure 17:
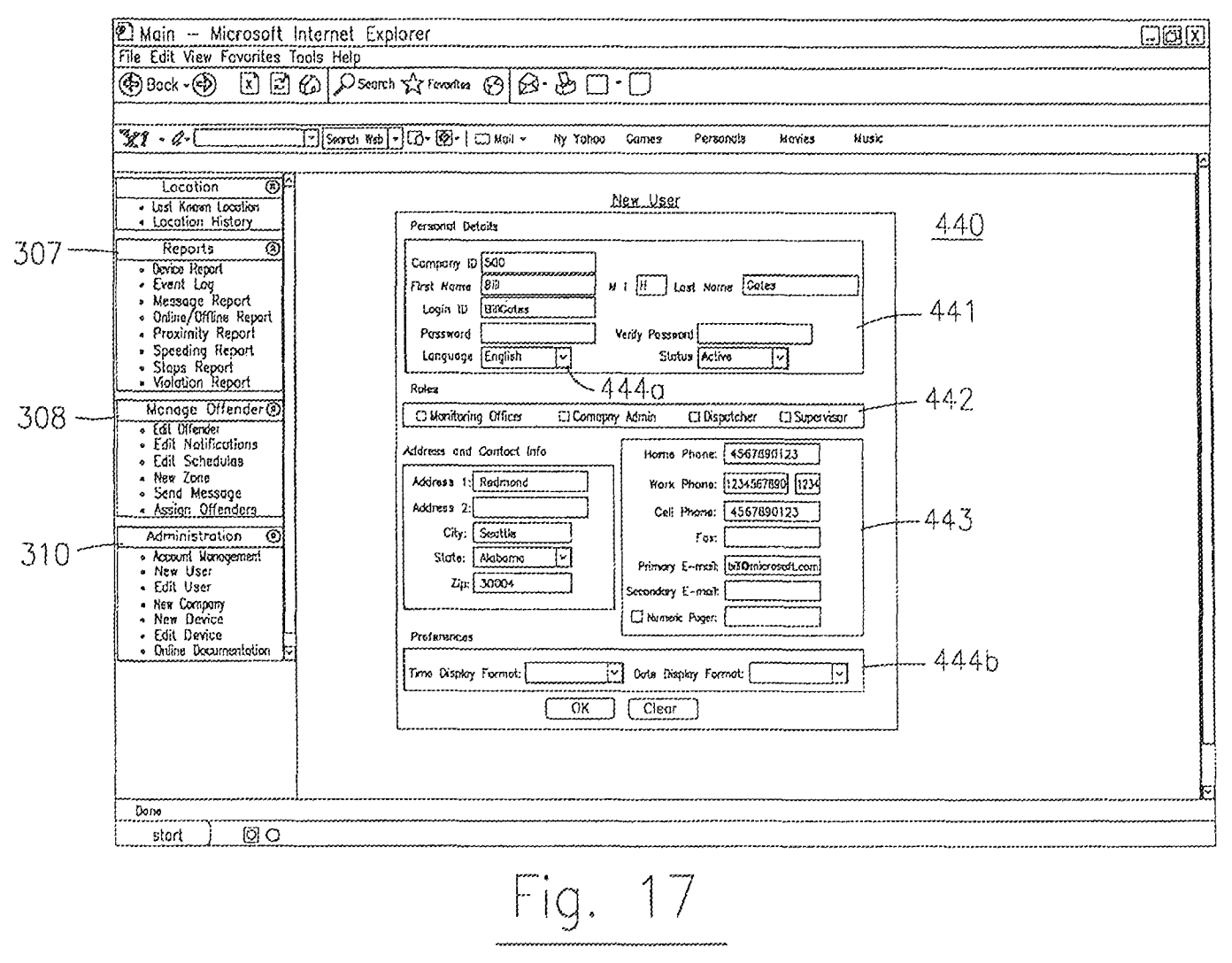

FIG. 17 shows another administrative menu 310 section, that of the new user template 440. The template collects system identification information such as user name and login password 441; the user's role 442 within the company or agency which will define to some extent the user's rights to access various aspects of the system, with a company administrator or supervisor having a greater rights than a monitoring officer or dispatcher. User contact information 443 is also collected, and user preferences 444a, 444b may also be input.

The system provides for the monitoring of a wide variety of criteria. A wearable device 100 may be equipped with a transdermal sensor for offender alcohol monitoring and with a thermometer for body temperature readings. In addition, stationary reporting devices such as active RFID readers 20 or smoke alarms may be placed in facilities 19 and generate signals to administrative hub 10. Upon obtaining a message from such a fixed reporting device, the administrative hub can automatically direct certain actions and make appropriate notifications. For instance, a smoke alarm message could lead the administrative hub 10 to seek confirmation from user facility staff, and in the absence of rapid confirmation that there is no problem, the appropriate fire department may be notified. Similarly, a RFID reader 20 may signal warning that an offender is entering a restricted area and cause appropriate action to be taken. Patients in assisted living facilities may also be equipped with RFID tags that are read and generate messages to the administrative hub 10 that may cause nearby doors to be locked to prevent patients from leaving the building or entering restricted areas such as kitchen and maintenance facilities, while avoiding the need to maintain the facility in a heavily supervised or lockdown mode.

Although preferred embodiments of the present invention have been disclosed in detail herein, it will be understood that various substitutions and modifications may be made to the disclosed embodiment described herein without departing from the scope and spirit of the present invention as recited in the appended claims.

We claim:

1. A portable tracking device comprising:
   a housing;
   a security strap attached to the housing;
   an optical conductor including a first portion extending along the strap, the first portion having a first end disposed proximate a first end of the strap and a second end disposed proximate a second end of the strap opposite the first end of the strap and a second portion extending along from the second end of the strap, the second portion having a first end disposed proximate the second end of the strap and a second end disposed proximate the first end of the strap, wherein the second end of the first portion is optically coupled to the first end of the second portion; back to the first end of the strap such that a first end of the optical conductor is disposed in the first end of the strap, a second end of the optical conductor is disposed in the first end of the strap, and the first portion of the optical conductor is substantially parallel to the second portion of the optical conductor;
   an optical source optically coupled to the first end of the first portion of the optical conductor proximate the first end of the strap;
   an optical detector optically coupled to the second end of the second portion of the optical conductor proximate the first end of the strap so that when the tracking device is attached to a wearer the strap need not be cut;
   a tamper detector disposed in the housing, coupled to the optical detector and constructed and arranged to identify the absence and/or presence of light detected by the optical detector; and
   circuitry disposed in the housing and configured and arranged to enable generation of data related to the location of the housing.

2. The portable tracking device of claim 1 wherein the optical source and the optical detector are disposed in the housing.

3. The portable tracking device of claim 2 wherein the first end of the securing strap is attached to the housing.

4. The portable tracking device of claim 3 further comprising at least one fastener for attaching the securing strap to the housing at a point along the securing strap separated from the first end of the securing strap.

5. The portable tracking device of claim 4 wherein the securing strap includes holes therethrough and the fastener passes through at least one of the holes.

6. The portable tracking device of claim 4 wherein the fastener is constructed and arranged to attach the securing strap to the housing without cutting the securing strap.

7. The portable tracking device of claim 5 wherein: the housing includes a lock bracket; and the fastener includes at least one pin attached to the lock bracket, the at least one pin being constructed and arranged to pass through at least one of the holes in the securing strap.

8. The portable tracking device of claim 7 further comprising a locking pin constructed and arranged to fasten the lock bracket to the housing.

9. The portable tracking device of claim 8 further comprising a housing tamper detector constructed and arranged to detect the absence of the locking pin.

10. The portable tracking device of claim 1 wherein the optical conductor includes an optical cable extending along the securing strap.

11. The portable tracking device of claim 1 wherein the optical conductor includes first and second optical cables extending between the first and the second ends of the securing strap and a light guide disposed at the second end of the securing strap and optically coupled to the first and second optical cables.

12. The portable tracking device of claim 1 further comprising a housing tamper detector constructed and arranged to detect tampering with the housing.

13. The portable tracking device of claim 12 wherein the housing tamper detector includes an optical tamper detector constructed and arranged to detect light within the housing.

14. The portable tracking device of claim 12 wherein the housing tamper detector includes a magnetic field sensor constructed and arranged to be activated if metal components of the housing are dislocated.

15. The portable tracking device of claim 1 wherein the circuitry includes a GPS receiver.

16. The portable tracking device of claim 1 wherein the circuitry includes a cellular transceiver.

17. The portable tracking device of claim 15 further comprising a transmitter disposed in the housing and configured and arranged to transmit signals related to the location of the housing based on the data generated by the GPS receiver.

18. The portable tracking device of claim 1 further comprising a light guide disposed in the first end of the strap, wherein the optical source and the optical detector are both coupled to the optical conductor via the light guide.

* * * * *